(12) United States Patent
Tadokoro et al.

(10) Patent No.: US 10,593,959 B2
(45) Date of Patent: Mar. 17, 2020

(54) ELECTRODE FOR METAL-AIR BATTERY

(71) Applicant: NIPPON STEEL & SUMITOMO METAL CORPORATION, Tokyo (JP)

(72) Inventors: Kenichiro Tadokoro, Tokyo (JP); Noriyuki Negi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 135 days.

(21) Appl. No.: 15/539,462

(22) PCT Filed: Dec. 24, 2015

(86) PCT No.: PCT/JP2015/086059
§ 371 (c)(1),
(2) Date: Jun. 23, 2017

(87) PCT Pub. No.: WO2016/104625
PCT Pub. Date: Jun. 30, 2016

(65) Prior Publication Data
US 2017/0352890 A1    Dec. 7, 2017

(30) Foreign Application Priority Data

Dec. 26, 2014  (JP) .................................. 2014-266528
Dec. 26, 2014  (JP) .................................. 2014-266529

(51) Int. Cl.
*H01M 4/96*   (2006.01)
*H01M 12/06*  (2006.01)
*H01M 12/08*  (2006.01)

(52) U.S. Cl.
CPC ............. *H01M 4/96* (2013.01); *H01M 12/06* (2013.01); *H01M 12/08* (2013.01); *Y02E 60/128* (2013.01)

(58) Field of Classification Search
CPC ......... H01M 12/06; H01M 12/08; H01M 4/96
See application file for complete search history.

(56) References Cited

U.S. PATENT DOCUMENTS 6,277,513 B1   8/2001  Swathirajan et al.
6,753,108 B1   6/2004  Hampden-Smith et al.
(Continued)

FOREIGN PATENT DOCUMENTS

CN   102324527 A   1/2012
JP   2000-311694 A  11/2000
(Continued)

OTHER PUBLICATIONS

Korean Office Action for corresponding Korean Application No. 10-2017-7016762, dated Feb. 26, 2019.
(Continued)

*Primary Examiner* — Karie O'Neill Apicella
(74) *Attorney, Agent, or Firm* — Birch, Stewart, Kolasch & Birch, LLP

(57) ABSTRACT

The present invention provides a novel and improved metal-air battery in which a lot of catalyst can be disposed in a triple phase boundary, and further, battery properties can be improved. In the metal-air battery according to the present invention, a catalyst layer of an air electrode of a metal-air battery contains a catalyst element and a carbon material, the carbon material comprises two materials of a carbon material A supporting thereon the catalyst element and a carbon material B not supporting the catalyst element, the catalyst layer comprises an agglomerate X containing the catalyst element, the carbon material A and the carbon material B as main components and an agglomerate Y containing the carbon material B as a main component, and the agglomerate X is a continuum and the agglomerate Y is dispersed in the agglomerate X.

12 Claims, 9 Drawing Sheets

(56) References Cited

U.S. PATENT DOCUMENTS

| | | |
|---|---|---|
| 2003/0049517 A1 | 3/2003 | Hampden-Smith et al. |
| 2003/0054218 A1 | 3/2003 | Hampden-Smith et al. |
| 2004/0048125 A1 | 3/2004 | Curelop et al. |
| 2006/0247122 A1 | 11/2006 | Hampden-Smith et al. |
| 2009/0283716 A1 | 11/2009 | Brault et al. |
| 2011/0045383 A1* | 2/2011 | Tadokoro ............... H01M 4/92 429/492 |
| 2011/0195339 A1 | 8/2011 | Iijima et al. |
| 2011/0229777 A1 | 9/2011 | Mak et al. |
| 2012/0082922 A1 | 4/2012 | Yamaki et al. |
| 2013/0089795 A1 | 4/2013 | Chase et al. |

FOREIGN PATENT DOCUMENTS

| | | |
|---|---|---|
| JP | 2003-514367 A | 4/2003 |
| JP | 2007-273145 A | 10/2007 |
| JP | 2008-502118 A | 1/2008 |
| JP | 2008-147007 A | 6/2008 |
| JP | 2009-252359 A | 10/2009 |
| JP | 2010-192436 A | 9/2010 |
| JP | 2010-198798 A | 9/2010 |
| JP | 2012-502427 A | 1/2012 |
| JP | 2013-247103 A | 12/2013 |
| JP | 2014-17230 A | 1/2014 |
| KR | 10-2009-0012303 A | 2/2009 |
| WO | WO 01/70392 A1 | 9/2001 |
| WO | WO 2006/001788 A1 | 1/2006 |
| WO | WO 2010/047415 A1 | 4/2010 |
| WO | WO 2011/011082 A1 | 1/2011 |
| ZA | 8302528 B | 4/1984 |

OTHER PUBLICATIONS

International Preliminary Report on Patentability and Written Opinion of the International Searching Authority (Forms PCT/IB/373 and PCT/ISA/237) for International Application No. PCT/JP2015/086059, dated Jun. 27, 2017, with an English translation of the Written Opinion.

Chinese Office Action and Search Report for corresponding Chinese Application No. 201580066005.7, dated Mar. 21, 2019, with English translation.

* cited by examiner

ELECTRODE FOR METAL-AIR BATTERY

TECHNICAL FIELD

The present invention relates to an electrode for a metal-air battery, in which an aqueous solution is used for the electrolytic solution. More specifically, the present invention relates to a positive electrode catalyst layer using oxygen as an active material

BACKGROUND ART

In general, a metal-air battery wherein an aqueous solution is used for the electrolytic solution is a battery combining an oxidation-reduction reaction of a metal, which is a negative electrode reaction, with an oxygen reduction reaction and an oxygen generation reaction, which are a positive electrode reaction, and since oxygen as a positive electrode active material can be taken from the air and the space for holding an active material in the positive electrode can be omitted, this battery is expected as a battery having a high energy density.

For example, in the case where the negative electrode metal is zinc, a discharge reaction between two electrodes proceeds as follows.

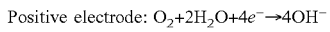

Positive electrode: $O_2 + 2H_2O + 4e^- \rightarrow 4OH^-$

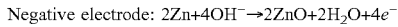

Negative electrode: $2Zn + 4OH^- \rightarrow 2ZnO + 2H_2O + 4e^-$

The reverse reaction is a charging reaction, and the metal-air battery functions as a primary battery and also as a secondary battery.

General configurations of a metal-air battery are illustrated in FIGS. 1 and 2. The metal-air battery is equipped with a negative electrode 1, a separator (or an electrolyte membrane) 2, a positive electrode 3, a catalyst layer 4, a porous layer 5, an aqueous electrolyte solution 6, a negative electrode collector 7, and a positive electrode collector 8. The metal-air battery has a configuration where the negative electrode 1 and the positive electrode 3 are separated by the separator 2 to prevent physical contact therebetween. The separator 2 is formed of a porous material to allow permeation of an aqueous electrolyte solution 6 that is strong alkali, or a polymer membrane capable of conducting $OH^-$ ion and has a configuration in which the aqueous electrolyte solution 6 has penetrated into pores of the negative electrode 1 and the positive electrode 3 and $OH^-$ can transfer between two electrodes during charge/discharge through the aqueous electrolyte solution. Among others, in the material of the positive electrode 3, a carbon material having electron conductivity is often used as the main component so as to ensure electron conductivity, and the outside thereof (the side opposite the separator) is opened to the atmosphere or exposed to a channel for supplying air, so that the air necessary for the discharge reaction at the positive electrode can diffuse into the positive electrode.

Furthermore, a catalyst is contained in the positive electrode to reduce the overvoltage for positive electrode reaction. The paths of electron, air and aqueous electrolyte solution must be connected to the catalyst so that the air (oxygen), water, electron and $OH^-$ participating in the electrode reaction can be delivered/received in the catalyst. Since an aqueous electrolyte solution forms the supply path for water or OH and the aqueous electrolyte solution must penetrate into the catalyst layer 4 from the separator side, the positive electrode 3 at least on the side facing the separator needs to be hydrophilic and porous. On the other hand, the surface on the opposite side of the positive electrode has a configuration of being opened to air but in order to make the configuration to allow for diffusion of air while avoiding the aqueous electrolyte solution as a strong alkali from leaking out of the open-to-air side, the air electrode on the open-to-air side is required to be hydrophobic and porous.

For satisfying these structural requirements, it is common to employ a two-layer configuration of, in order from the separator-facing side (negative electrode-facing side), a hydrophilic porous catalyst layer 4 containing a carbon material and a catalyst element as main components, and a hydrophobic porous layer 5. The current collector 8 on the positive electrode side for delivering/receiving an electron to/from an external circuit generally uses a metal mesh and is disposed to contact with the open-to-air side of the hydrophobic porous layer (FIG. 2) or disposed between the catalyst layer and the hydrophobic porous layer (FIG. 1).

In order for an efficient electrode reaction to proceed in the positive electrode having the above-mentioned configuration, it is important to promote mass transfer by ensuring a path through which a substance necessary for the electrode reaction transfers to the catalyst contained in the electrode. From the more microscopic viewpoint, a catalyst as a reaction site must be present as much as possible in a triple phase boundary that is a junction of a carbon material network capable of making electrical conduction with an external circuit and supplying an electron necessary for the reaction, an air diffusion network formed by continuous pores allowing for diffusion of air from the atmosphere outside the battery, and an aqueous electrolyte solution network capable of delivering/receiving $OH^-$ to/from the negative electrode according to charge/discharge.

Some methods have been heretofore proposed to form such a triple phase boundary. In a general two-layer configuration combining a hydrophilic catalyst layer and a hydrophobic porous layer, when an aqueous electrolyte solution penetrates into a porous catalyst layer formed of a hydrophilic material, the aqueous electrolyte solution penetrates into all pores formed in the catalyst layer, and the triple phase boundary where the aqueous electrolyte solution and air are present is substantially limited to an interface 9 between the hydrophilic catalyst layer and the hydrophobic porous layer (FIG. 3). That is, most of catalyst elements contained in the catalyst layer are surrounded by the aqueous electrolyte solution, and the air (oxygen) necessary for an electrode reaction is not supplied and cannot contribute to the reaction.

The technique employed widely in general to avoid such a situation includes a method of compounding PTFE as a water-repellent component with a catalyst layer formed of a hydrophilic carbon material. As a similar method, Patent Document 1 has proposed a method of compounding wax as a hydrophobic component with a catalyst layer. The method of compounding the hydrophobic PTFE or wax with a catalyst layer aims to form a hydrophobic portion in part of a hydrophilic porous catalyst layer, thereby forming an air (oxygen) diffusion path in the catalyst layer and increasing a triple phase boundary.

As another method, Patent Document 2 has proposed an electrode in which texture processing is applied to an interface between a hydrophilic porous catalyst layer and a hydrophobic porous layer and an uneven shape is thereby imparted to the interface. This method aims to increase the area of an interface between a hydrophilic porous catalyst layer filled with an aqueous electrolyte solution and a hydrophobic porous layer and thereby increase a triple phase boundary that is formed in the interface.

As still another method, Patent Document 3 has proposed a method of forming a porous catalyst layer from a mixture of a hydrophilic porous material having supported thereon a catalyst element, and a hydrophobic porous material. As with the method of compounding PTFE or wax, the basic idea of this method aims to compound a hydrophobic material in a hydrophilic porous catalyst layer, thereby forming an air diffusion path, increasing a triple phase boundary, and achieving efficiency of the electrode reaction.

On the other hand, similarly to the metal-air battery, control of hydrophilic and hydrophobic materials is performed also in the catalyst layer of an air electrode of a fuel cell in which the active material is oxygen and an oxygen reducing catalyst is disposed. In the catalyst layer of an air electrode (positive electrode) of a fuel cell, it is important to realize a high density of the catalyst present in a triple phase boundary formed by continuous pores enabling oxygen as an active material in air to diffuse, an electrolyte material as a proton conducting path, and a carbon material as an electron conducting path. In general, the electrolyte material as a proton conducting path shows minimum proton conduction resistance under highly humid conditions and therefore, the material constituting the catalyst layer must be made hydrophilic to thereby keep the electrolyte material in a wet state and suppress increase of the proton conduction resistance.

On the other hand, in order to prevent blockage of a gas diffusion path due to water formed by an air electrode reaction, a diffusion path for air in which oxygen as an active material is contained needs to be ensured by compounding a hydrophobic material in a catalyst layer. High-level control of hydrophilic and hydrophobic materials satisfying these two contradictory requirements is required particularly for a high-performance catalyst layer generating power at a high current density. From such viewpoint, Patent Document 4 has proposed a method where carbon black being hydrophobic and having a three-dimensional structure advantageous to gas diffusion is incorporated into a catalyst layer. Furthermore, in Patent Document 5, as a technique for satisfying both conditions wherein an electrolyte material is kept in a wet state so as not to impair proton conductivity of an electrolyte material as a proton conduction path and wherein a gas diffusion path is ensured, a technique of dispersing a hydrophobic carbon material having an agglomerate configuration in a catalyst layer has been proposed.

Patent Document 6 discloses an electrode for a polymer electrolyte fuel cell, in which a carbon material having a water vapor adsorption amount of 1 to 20 ml/g at a relative humidity of 90% is used as a gas diffusion carbon material, whereby blockage of a gas diffusion path due to water can be effectively prevented and a current can be generated with stable voltage.

Patent Document 7 discloses a technique for enhancing the gas diffusibility in an electrode by satisfying the condition of (D90/D50)≥2.5, wherein D50 and D90 are particle diameters when the volume cumulative frequency in the particle size distribution of a catalyst powder for a fuel cell reaches 50% and 90%, respectively.

Patent Document 8 discloses an electrode composed of a first layer containing a mesoporous nano-structured hydrophobic material and a second layer being disposed on the first layer and containing a mesoporous nano-structured hydrophilic material, so as to provide a material suitable for use as a gas diffusion electrode.

RELATED ART

Patent Document

[Patent Document 1] Kohyo (National Publication of Translated Version) 2008-502118
[Patent Document 2] Kohyo 2003-514367
[Patent Document 3] Kohyo 2012-502427
[Patent Document 4] Kokai (Japanese Unexamined Patent Publication) 2007-273145
[Patent Document 5] Kokai 2009-252359
[Patent Document 6] International Publication WO No. 2010/047415
[Patent Document 7] Kokai 2008-147007
[Patent Document 8] Kohyo 2012-502427

SUMMARY OF THE INVENTION

Problems to be Solved by the Invention

As for the compounding of PTFE or the compounding of wax proposed in Patent Document 1, an air diffusion path is ensured by providing, in a catalyst layer, a hydrophobic portion not allowing for penetration of an aqueous electrolyte solution, and a certain effect may be expected, but since the material compounded is substantially an insulator, it is disadvantageously difficult to adjust the balance between electron conductivity and hydrophobicity. Specifically, as illustrated in FIG. 5, when the content of hydrophobic PTFE or wax 10 in the catalyst layer is excessively increased so as to sufficiently secure an air diffusion path, the electron conduction resistance rises. On the other hand, as illustrated in FIG. 4, when the content of PTFE or wax 10 is excessively decreased so as to suppress the rise of electron conduction resistance, air diffusibility becomes insufficient. In particular, for the purpose of extracting a large current density, it has been difficult to bring out a satisfactory performance only by adjusting the amount of PTFE or wax.

As for the texture processing of the interface between the catalyst layer and the hydrophobic porous layer proposed in Patent Document 2, the area of the triple phase boundary geometrically increases in a certain amount (FIG. 6), but the portion in which a triple phase boundary can be formed is limited to the interface between the catalyst layer and the hydrophobic porous layer, and this cannot be a technique effectively utilizing the catalyst element inside the catalyst layer.

The method of mixing a hydrophobic porous material proposed in Patent Document 3 is believed to have a considerable effect on the increase of area of the triple phase boundary. However, in the method of merely mixing the material, the same problem as in the compounding of PTFE or in the case of Patent Document 1 is caused. That is, as illustrated in FIG. 7, when the content of the hydrophobic porous material is small, the hydrophobic porous material 11 inside the catalyst layer is surrounded by the hydrophilic porous material. The hydrophobic porous material 11 surrounded by the hydrophilic porous material does not substantially function as an air diffusion path and is insufficient to obtain a high battery performance. On the other hand, as illustrated in FIG. 8, when the percentage content of the hydrophobic porous material 11 is increased in order for the hydrophobic porous material 11 to have a connected configuration, a hydrophilic porous material surrounded by the hydrophobic porous material 11 may be prepared. As a result, a portion where the electrolytic solution cannot reach the catalyst element is appeared, and a high battery performance cannot be therefore obtained.

In particular, for obtaining a high power density, a catalyst amount not less than a certain amount is required, but in addition thereto, when the content of the hydrophobic porous material is increased to have a connected configuration, the thickness of the catalyst layer becomes larger than necessary, and each path length of electron conduction path, air diffusion path, etc. is consequently increased, as a result, an IR loss accompanying the mass transfer resistance is increased, leading to inefficiency. Furthermore, in Patent Document 3, the hydrophilic porous material and the hydrophobic porous material are differentiated by the presence or absence of a polar group, but not only it is difficult to secure a material having absolutely no polar group but also there is a material having a polar group but substantially showing hydrophobicity depending on the amount thereof. Thus, a catalyst layer capable of stably exhibiting high performance can be hardly designed by the method described in this document.

In the methods of Patent Documents 4 to 6 proposed in the field of fuel cell, the hydrophobic carbon material itself has a well grown three-dimensional structure and readily works as an air diffusion path and in addition, since the hydrophobic carbon material forms an agglomerate configuration, an excellent effect of ensuring a gas diffusion path with a small compounding amount of the hydrophobic carbon material can be expected also in the field of metal-air battery (FIG. 9, FIG. 11). Here, FIG. 11 is an explanatory view enlargedly illustrating a rough configuration of the catalyst layer disclosed in Patent Document 5. The catalyst layer disclosed in Patent Document 5 is separated into a catalyst containing agglomerate 16 and a gas diffusion agglomerate 17. The catalyst containing agglomerate 16 is composed of a carbon material 12 having supported thereon a catalyst element, an electrolyte material 13, and a carbon material 14 of conductive assistant. The gas diffusion agglomerate 17 is composed of a gas diffusion carbon material 15. The hydrophobic porous material 11 of FIG. 9 corresponds to the gas diffusion carbon material 15 of FIG. 11. As illustrated in FIG. 11, in Patent Document 5, the catalyst containing agglomerate 16 is a continuum, and the gas diffusion agglomerate 17 is dispersed in the catalyst containing agglomerate 16. However, in a metal-air battery in which an aqueous electrolyte solution penetrates into a catalyst layer through a catalyst support that is a hydrophilic carbon material, as illustrated in FIG. 9 or 12, the portion 9 in which formation of a triple phase boundary can be expected is limited to the interface between a hydrophilic agglomerate and a hydrophobic agglomerate. Accordingly, the catalyst in the hydrophilic agglomerate is not as effectively utilized as in the case of application to a fuel cell, and in order to obtain high battery performance, there is a problem that a special effort appropriate for usage in a metal-air battery is required.

Furthermore, in Patent Documents 4 and 5, the water vapor adsorption amount at a relative humidity of 90% is specified as an indicator for limiting the carbon material supporting a catalyst element. The water vapor adsorption amount at a relative humidity of 90% can be said to be a quantitative indicator. However, this indicator is an indicator to ensure the water amount (converted to a water vapor amount) capable of being held on the surface of the hydrophilic carbon material, i.e., to ensure a humid environment of the electrolyte material disposed in the vicinity of the hydrophilic carbon material. This indicator is an indicator specific to the field of fuel cell. On the other hand, in the metal-air battery that is put into action by penetration of an aqueous electrolyte solution, wettability of the aqueous electrolyte solution on the carbon material surface is important. Accordingly, the indicator above, i.e., the water amount capable of being held by the carbon material, cannot be a proper indicator.

Meanwhile, in Patent Documents 4 to 6, the water vapor adsorption amount at a relative humidity of 90% is specified as an indicator for limiting the gas diffusion carbon material not supporting a catalyst element. The water vapor adsorption amount at a relative humidity of 90% can be said to be a quantitative indicator. However, this indicator is an indicator to ensure that a carbon material having hydrophobicity allows for diffusion of a gas acting as a fuel in a fuel cell operating environment. This indicator is an indicator specific to the field of fuel cell. On the other hand, in the metal-air battery that is put into action by virtue of penetration of an aqueous electrolyte solution, wettability of the aqueous electrolyte solution on the carbon material surface is important. Accordingly, the indicator above cannot be a proper indicator.

In Patent Documents 7 and 8, properties regarding hydrophilicity or hydrophobicity required of a catalyst layer material of an electrode are not quantitatively defined. In the techniques disclosed in Patent Documents 7 and 8, it is therefore difficult to intentionally increase the area of a triple phase boundary in a positive electrode of a metal-air battery.

Thus, in the techniques disclosed in Patent Documents 1 to 8, it has been difficult to widen a triple phase boundary (in other words, dispose a lot of catalyst in a triple phase boundary) in a positive electrode of a metal-air battery. Even if the triple phase boundary is widened, for such a reason that the electron conductivity is impaired, high battery properties cannot be obtained.

The present invention has been made by taking into account the above-described problems, and an object of the present invention is to provide a novel and improved metal-air battery in which a lot of catalyst can be disposed in a triple phase boundary and in turn, battery properties can be improved.

Means to Solve the Problems

In order to attain the object above, in view of the mechanism of action of the metal-air battery that is put into action by virtue of penetration of an aqueous electrolyte solution, the present inventors have studied on an optimal configuration as a positive electrode catalyst layer of a metal-air battery in line with guidelines including, for example, 1) maximally increasing the catalyst present in a triple phase boundary, 2) using a carbon material for the hydrophobic material in order to prevent electron conductivity in a catalyst layer from being impaired by a hydrophobic material introduced, and 3) forming a configuration capable of minimizing the introduction amount of a hydrophobic material in a catalyst layer so as not to increase each path length of an electron conduction path, an air diffusion path, and an OH$^-$ ion conduction path.

As a result, the present inventors have conceived an idea of, as illustrated in FIG. 10 or FIG. 13, dividing the catalyst layer configuration into two agglomerate of a hydrophilic agglomerate (agglomerate X) 20 based on a hydrophilic carbon material (carbon material A) 18 having supported thereon a catalyst element and a hydrophobic agglomerate (agglomerate Y) 21 based on a hydrophobic carbon material (carbon material B) 19 not containing a catalyst element. Then, a configuration where the hydrophilic agglomerate 20 is a continuous configuration and the hydrophobic agglomerate 21 is dispersed in the continuous configuration of the hydrophilic agglomerate, is formed. Furthermore, the hydrophobic carbon material 19 is finely dispersed inside the hydrophilic agglomerate 20. As a result, a triple phase boundary was successfully formed to an unprecedented extent.

Next, the present inventors have focused attention on the proportion of the micropore surface area (pores having a diameter of 2 nm or less) in the total surface area of the hydrophilic carbon material supporting a catalyst element. Specifically, the present inventors have focused attention on a case where the proportion of the micropore surface area in the total surface area of the hydrophilic carbon material is not dominating and a case where the proportion is dominating.

In the case where the proportion of the micropore surface area in the total surface area of the hydrophilic carbon material is dominating, when the depth of the micropore is too deep, air or the electrolytic solution can hardly reach the catalyst disposed in the deep part of the micropore. For this reason, if the depth of the micropore is too deep, an inefficient metal-air battery results. Accordingly, in the case of a hydrophilic carbon material where the proportion of the micropore surface area is high, the present inventors have reduced the average particle diameter (average diameter of particles) so as not to extremely increase the depth of the micropore.

On the other hand, in the case where the proportion of the micropore surface area in the total surface area of the hydrophilic carbon material is not dominating, air can be efficiently diffused while putting an aqueous electrolyte solution into contact with a catalyst element supported on the hydrophilic carbon material. In turn, the catalyst present in a triple phase boundary can be caused to exist at a higher density.

Furthermore, the present inventors have focused attention also on the particle diameter distribution (distribution of particle diameters) of the hydrophilic carbon material. More specifically, if the particle diameter distribution is too broad, a hydrophilic carbon material having a small particle diameter may cause clogging of the catalyst layer. In this case, air can hardly diffuse into the catalyst layer. Accordingly, the present invention has made the particle diameter distribution of the carbon material of the catalyst layer as sharp as possible. In turn, the catalyst present in a triple phase boundary can be caused to exist at a higher density.

Next, considering that the properties regarding hydrophilicity or hydrophobicity required of the catalyst layer material of an air electrode of a metal-air battery are wettability of an aqueous electrolyte solution, the present inventors have studied an appropriate quantitative indicator enabling quantitative judgment about the hydrophilicity and hydrophobicity required of the catalyst layer material. As a result, the present inventors have found that this indicator is a water vapor adsorption amount at a relative pressure of 0.1. By assigning the indicator to a water vapor adsorption amount at a relative pressure of 0.1, a catalyst layer stably providing high performance can be designed.

Incidentally, in Example 9 of Patent Document 5, a catalyst layer similar to the catalyst layer illustrated in FIG. 10 or FIG. 13 is disclosed. That is, in the catalyst layer disclosed in Example 9 of Patent Document 5, the hydrophilic agglomerate also contains a hydrophilic carbon material having supported thereon a catalyst element and a carbon material having a relatively low water vapor adsorption amount, i.e., a hydrophobic carbon material. The hydrophilic carbon material having supported thereon a catalyst element is a special carbon material in which a three-dimensional structure is not grown and the proportion of surface areas of micropores with a diameter of 2 nm or less in the total surface area is extremely dominating, making it very easy to hold water. If a carbon material not dominated by micropores is used for the hydrophilic carbon material having supported thereon a catalyst, this leads to drying of the electrolyte material which coexists in the catalyst layer. In other words, significantly poor power generation performance results under dry condition that is the practical power generation condition of a fuel cell. For this reason, in Example 9 of Patent Document 5, a carbon material extremely dominated by micropores is used as the hydrophilic carbon material.

However, in Example 9 of Patent Document 5, the average particle diameter and particle diameter distribution of the hydrophilic carbon material are not taken into consideration at all. Accordingly, in Example 9 of Patent Document 5, the depth of the micropore may be too deep. In addition, clogging of the catalyst layer may occur due to a hydrophilic carbon material particle having a small particle diameter. Furthermore, in Patent Document 5, the carbon material is evaluated based on a water vapor adsorption amount at a relative humidity of 90%, which is an indicator completely different from the water vapor adsorption amount at a relative pressure of 0.1. In this way, the present invention is entirely different from the configuration disclosed in Example 9 of Reference Document 5.

The present invention includes the following configurations.

(1) An electrode for a metal-air battery, wherein:
a catalyst layer of an air electrode of a metal-air battery contains a catalyst element and a carbon material,
the carbon material comprises two materials of a carbon material A having supported thereon the catalyst element and a carbon material B not supporting the catalyst element,
the catalyst layer comprises an agglomerate X containing more than 50 mass % in total of the catalyst element, the carbon material A and the carbon material B, and an agglomerate Y containing more than 50 mass % of the carbon material B,
the agglomerate X is a continuum and the agglomerate Y is dispersed in the agglomerate X,
the carbon material A satisfies the following characteristic feature (i) or (ii), and
in the carbon material B, a water vapor adsorption amount is less than 0.1 cm$^3$/g in an environment of 25° C. and a relative pressure of 0.1 and a ratio (X/S$_{BET}$) of the DBP absorption (X) (cm$^3$/100 g) to a specific surface area (S$_{BET}$) by BET evaluation is 0.5 or more;
(i) in the carbon material A, the water vapor adsorption amount is 0.1 cm$^3$/g or more in an environment of 25° C. and a relative pressure of 0.1, a ratio S$_{micro}$/S$_{total}$ of a micropore surface area S$_{micro}$ as determined by t-plot analysis of a nitrogen adsorption isotherm to a total surface area S$_{total}$ is 0.90 or more, an average particle diameter d50 is less than 1.5 μm, and a ratio (d90−d10)/d50 of the difference between d90 and d10 (d90−d10) to d50 is less than 1.0; or
(ii) in the carbon material A, the water vapor adsorption amount is 0.1 cm$^3$/g or more in an environment of 25° C. and a relative pressure of 0.1 and the ratio S$_{micro}$/S$_{total}$ of the micropore surface area S$_{micro}$ as determined by t-plot analysis of a nitrogen adsorption isotherm to the total surface area S$_{total}$ is 0.90 or less.

(2) The electrode for a metal-air battery according to (1), wherein:
in the carbon material A, the water vapor adsorption amount is 0.1 cm$^3$/g or more in an environment of 25° C. and a relative pressure of 0.1, the ratio S$_{micro}$/S$_{total}$ of the micropore surface area S$_{micro}$ as determined by t-plot analysis of a nitrogen adsorption isotherm to the total surface area S$_{total}$ is 0.90 or more, the average particle diameter d50 is less than 1.5 μm, and the ratio (d90−d10)/d50 of the difference between d90 and d10 (d90−d10) to d50 is less than 1.0, and
the content of the carbon material B in the catalyst layer is from more than 10 mass % to less than 50 mass %.

(3) The electrode for a metal-air battery according to (1), wherein:

in the carbon material A, the water vapor adsorption amount is 0.1 cm$^3$/g or more in an environment of 25° C. and a relative pressure of 0.1 and the ratio $S_{micro}/S_{total}$ of the micropore surface area $S_{micro}$ as determined by t-plot analysis of a nitrogen adsorption isotherm to the total surface area $S_{total}$ is 0.90 or less, and the content of the carbon material B in the catalyst layer is from 5 mass % to less than 50 mass %.

(4) The electrode for a metal-air battery according to any one of (1) to (3), wherein one or more carbon material agglomerates each having a size of 300 nm or more in terms of an equivalent-circle diameter and not supporting a catalyst element are present in a visual field of 10 μm×10 μm in a cross-section of the catalyst layer.

(5) The electrode for a metal-air battery according to any one of (1) to (4), wherein:

a percentage content α of the carbon material B on a metal electrode-facing side in the catalyst layer is from 0 mass % to less than 20 mass %, a percentage content β of the carbon material B on an open-to-air side in the catalyst layer is from more than 10 mass % to less than 50 mass %, and α<β is satisfied.

Effects of the Invention

As described above, according to the present invention, a lot of catalyst can be disposed in a triple phase boundary and in turn, the battery properties can be improved.

MODE FOR CARRYING OUT THE INVENTION

Figure 1:
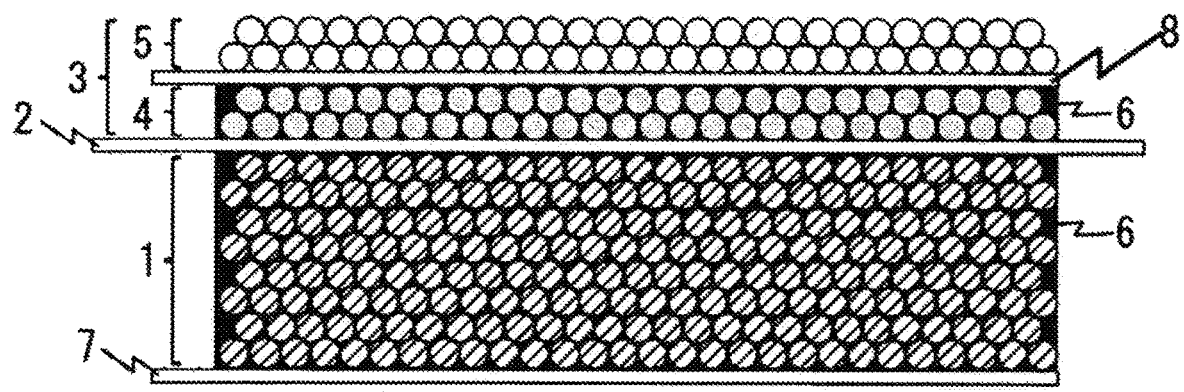
FIG. 1 An explanatory view illustrating a rough configuration of a conventional metal-air battery.
Figure 2:
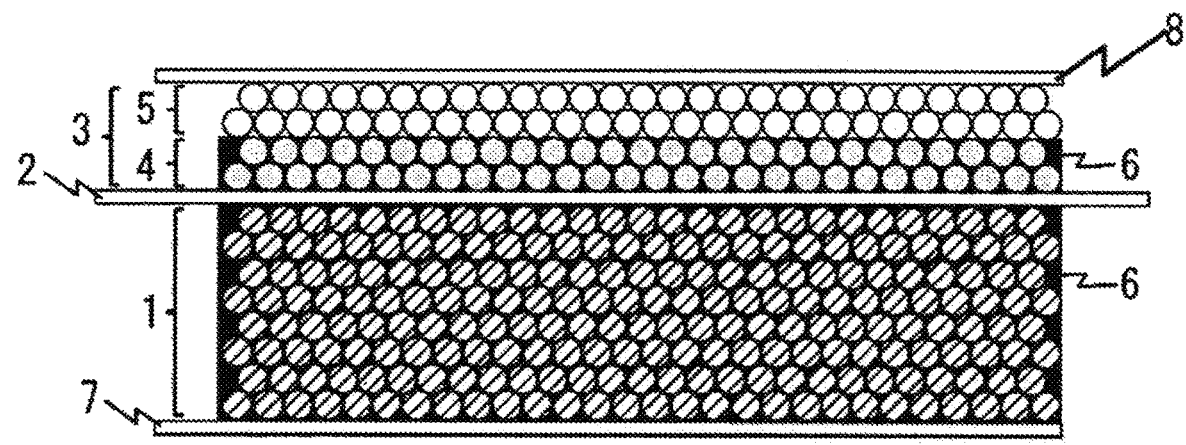
FIG. 2 An explanatory view illustrating a rough configuration of a conventional metal-air battery.
Figure 3:
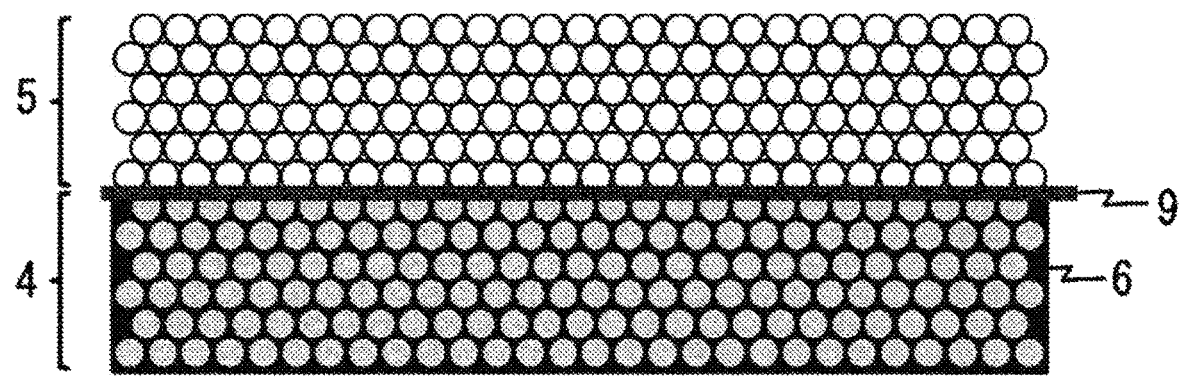
FIG. 3 An explanatory view illustrating a rough configuration of a conventional metal-air battery positive electrode.
Figure 4:
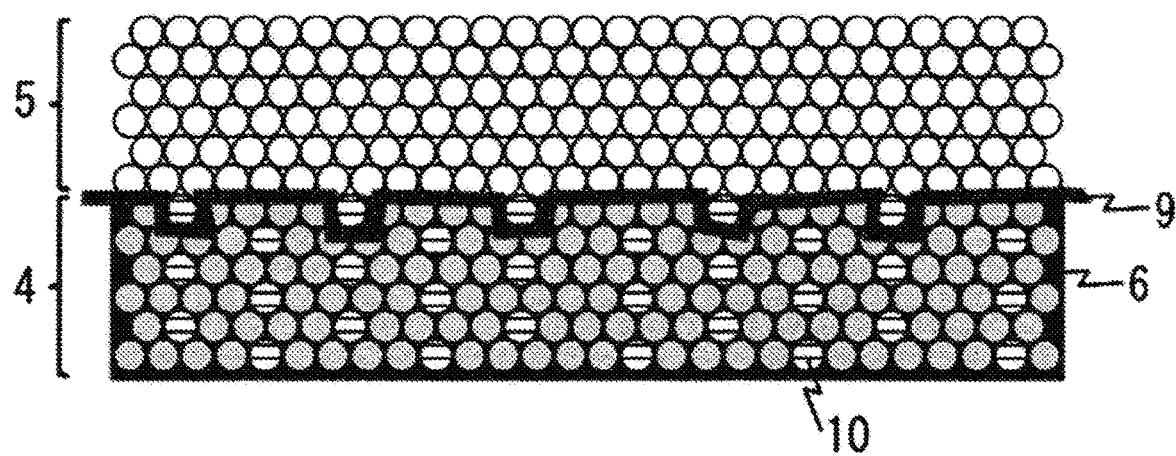
FIG. 4 An explanatory view illustrating a rough configuration of a conventional metal-air battery positive electrode.
Figure 5:
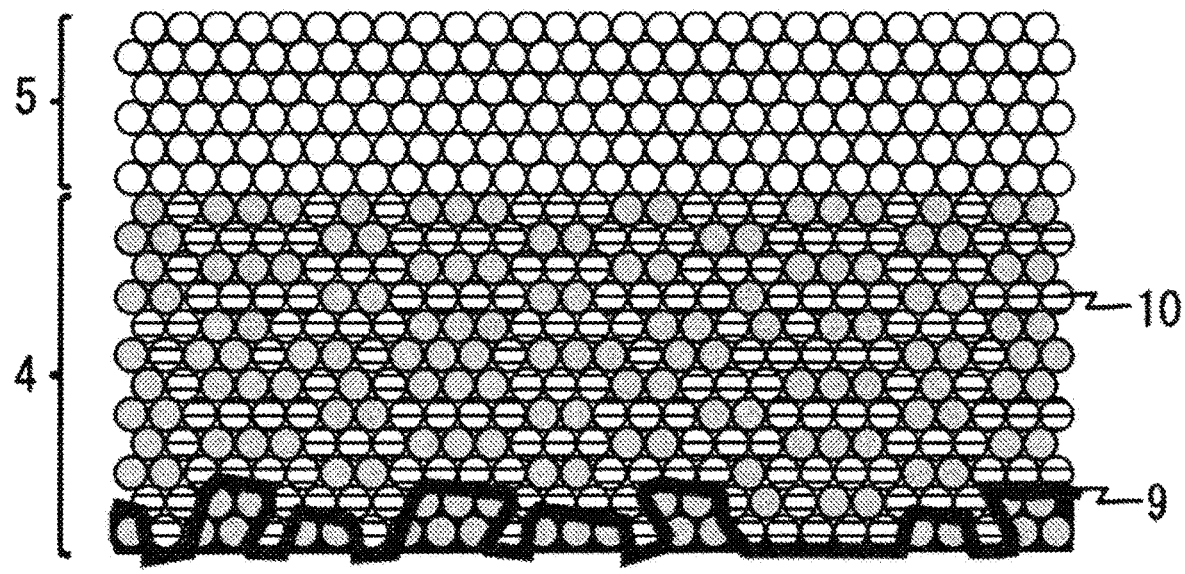
FIG. 5 An explanatory view illustrating a rough configuration of a conventional metal-air battery positive electrode.
Figure 6:
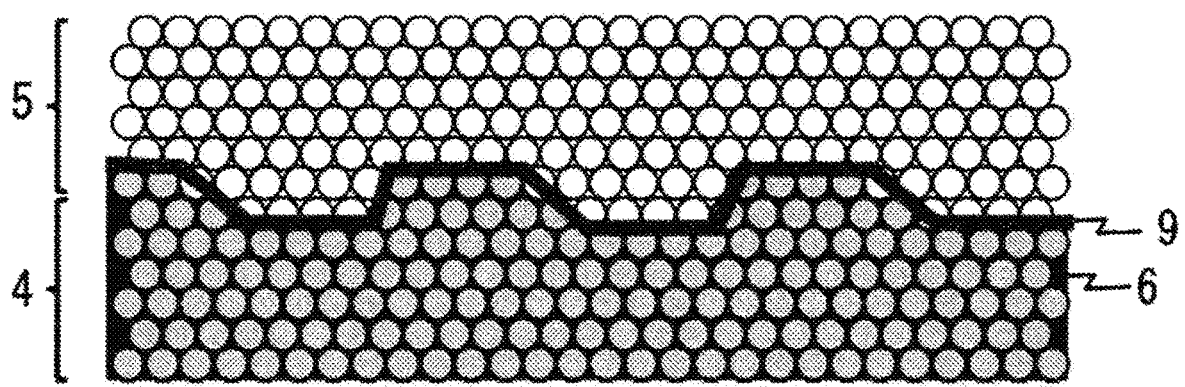
FIG. 6 An explanatory view illustrating a rough configuration of a conventional metal-air battery positive electrode.
Figure 7:
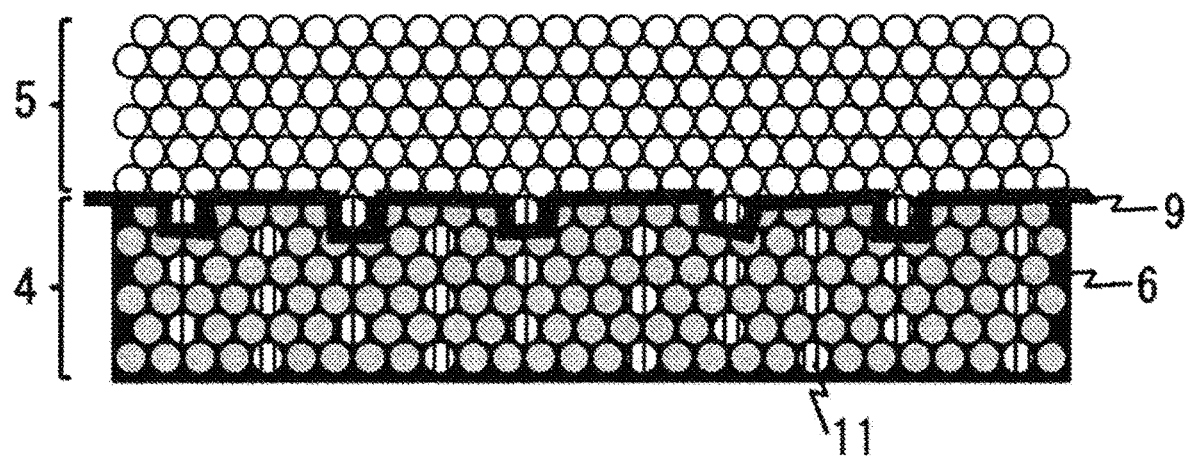
FIG. 7 An explanatory view illustrating a rough configuration of a conventional metal-air battery positive electrode.
Figure 8:
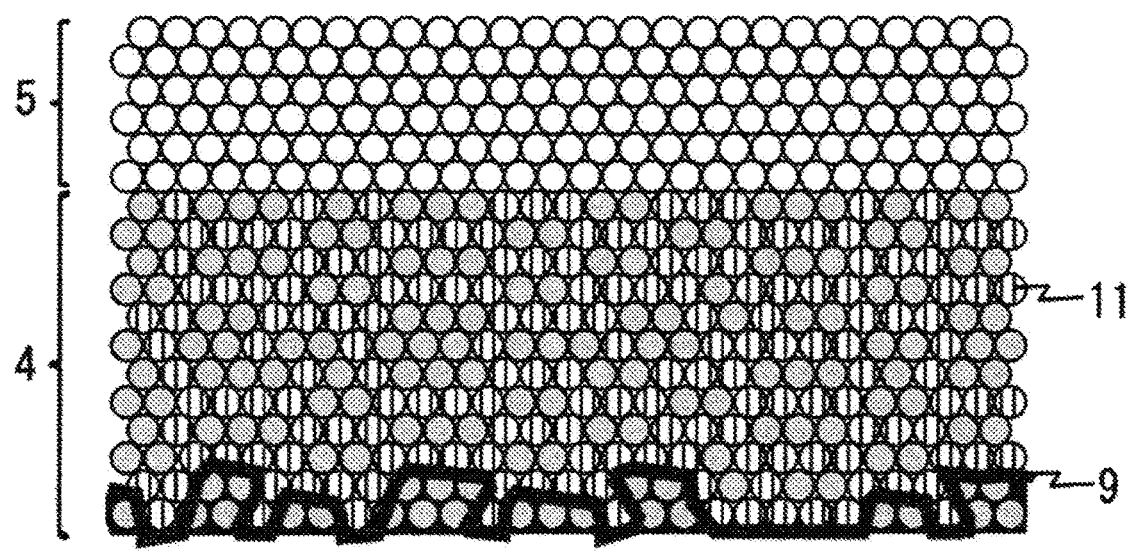
FIG. 8 An explanatory view illustrating a rough configuration of a conventional metal-air battery positive electrode.
Figure 9:
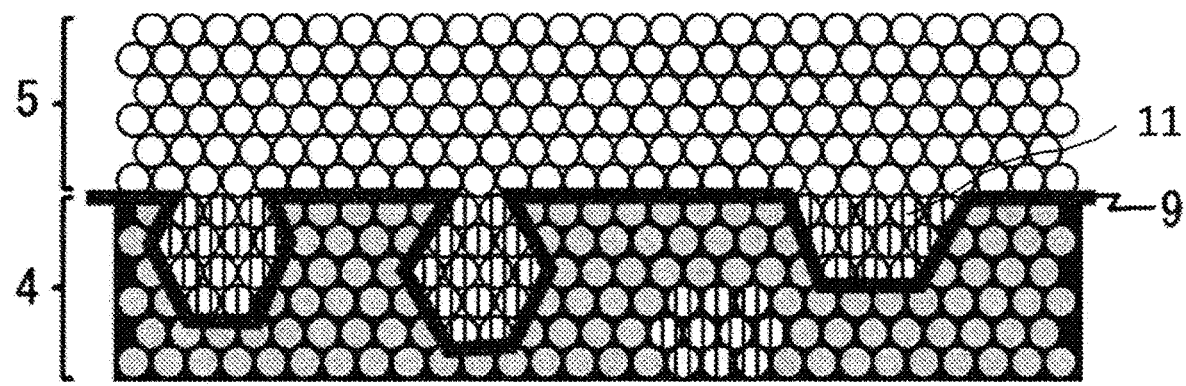
FIG. 9 An explanatory view illustrating a rough configuration of the positive electrode when the catalyst layer of a conventional metal-air battery is used for a metal-air battery (when penetrated by an aqueous electrolyte solution).

Preferred embodiments of the present invention are described in detail below by referring to the accompanying drawings. Here, in the present description and drawings, elements having substantially the same function/configuration are denoted by the same reference numerals, and the redundant explanation thereof is omitted.

[Configuration of Catalyst Layer in Air Electrode of Metal-Air Battery of the Present Invention]

Figure 10:
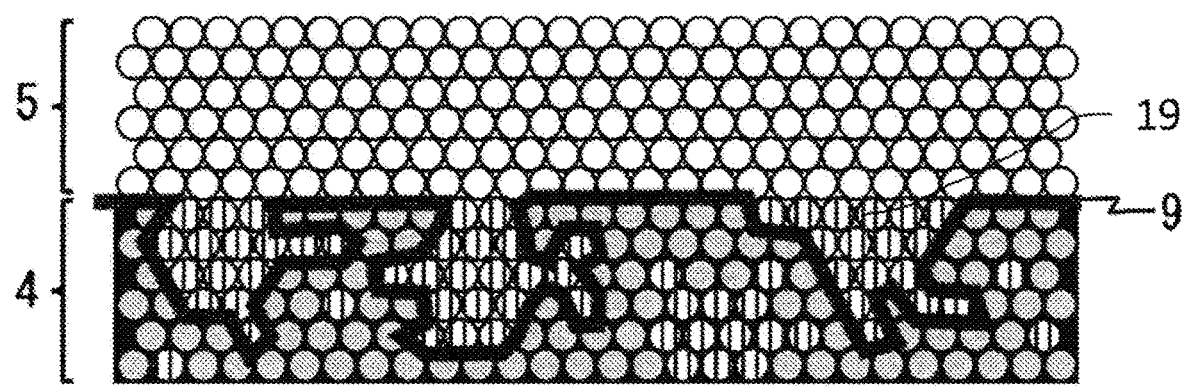
FIG. 10 An explanatory view illustrating a rough configuration of the catalyst layer according to the present invention.
Figure 11:
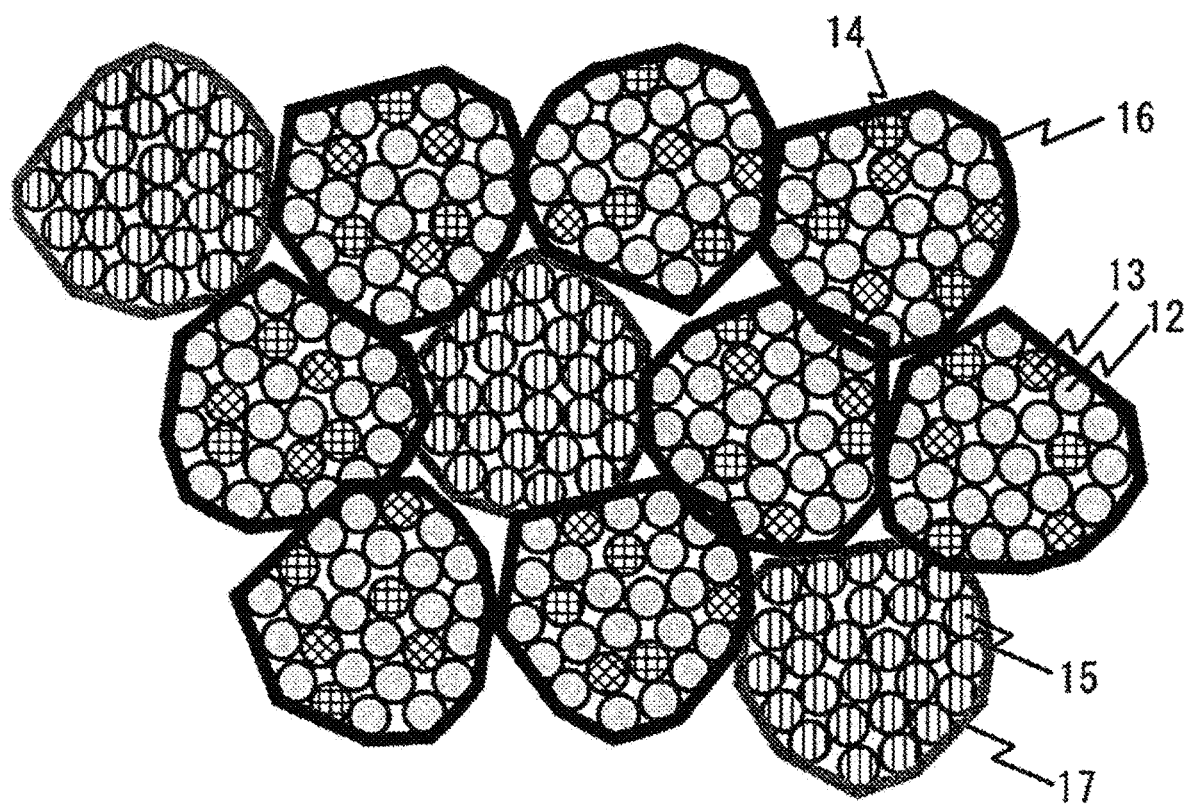
FIG. 11 An explanatory view (enlarged view) illustrating a rough configuration of the catalyst layer of a conventional fuel cell.
Figure 12:
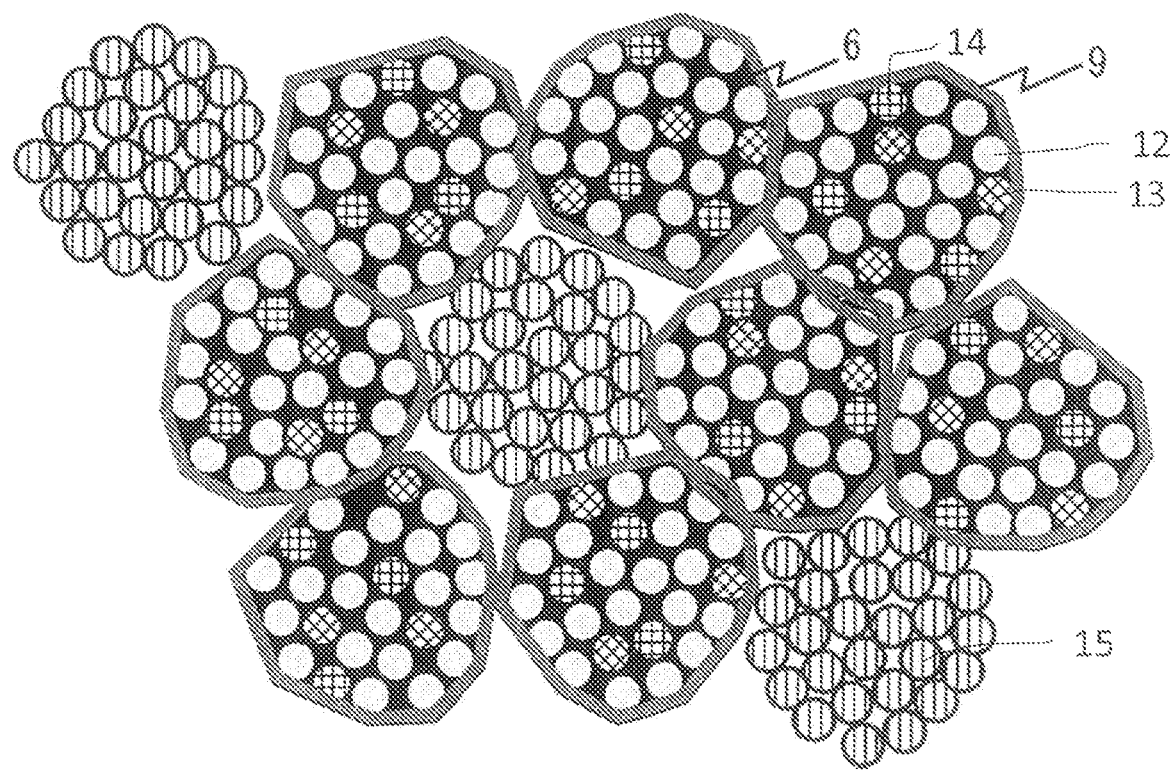
FIG. 12 An explanatory view (enlarged view) illustrating a rough configuration of the catalyst layer when the catalyst layer of a conventional fuel is used for a metal-air battery (when penetrated by an aqueous electrolyte solution).
Figure 13:
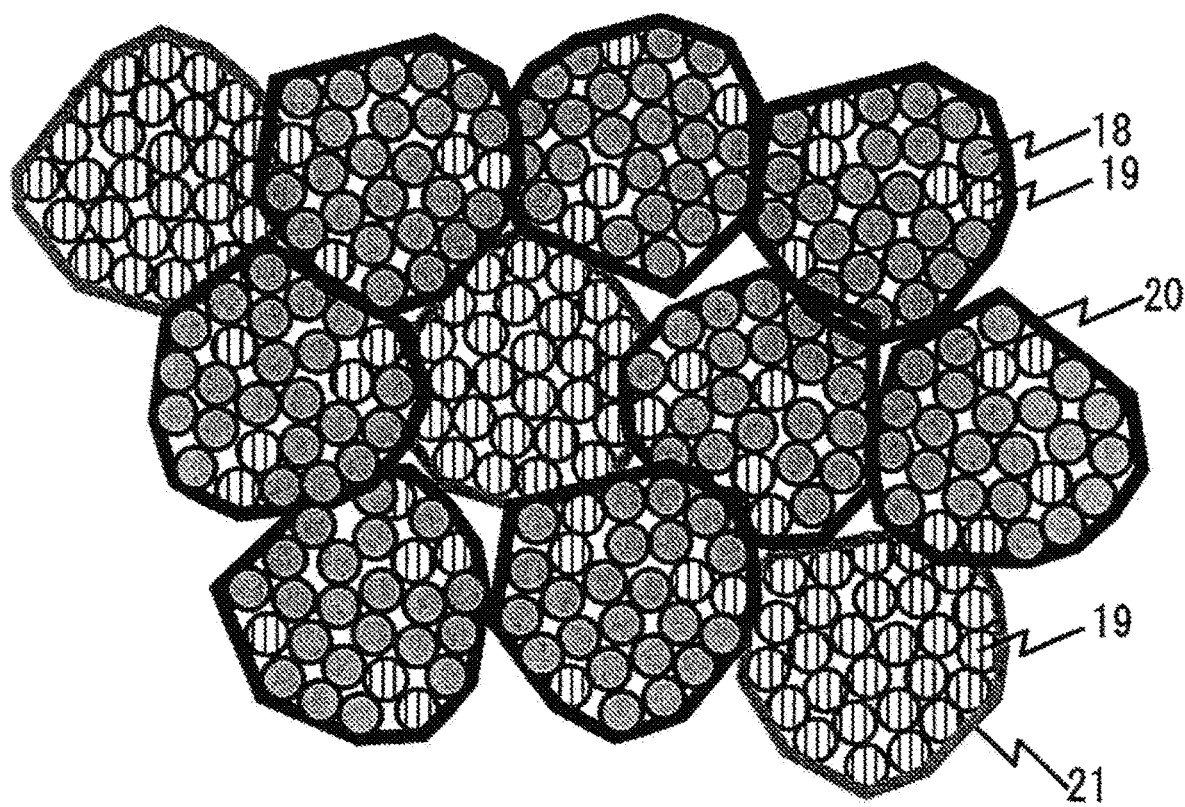
FIG. 13 An explanatory view (enlarged view) illustrating a rough configuration of the catalyst layer according to the present invention.

FIGS. 10 and 13 illustrate a schematic view regarding the configuration of the catalyst layer constituting the present invention. In all drawings, each material or agglomerate is schematically expressed, and the shape or relative size of each material differs from the actual shape or size. The catalyst layer contained in the electrode for a metal-air battery of the present invention is formed of a mixture containing a catalyst element and a carbon material. The carbon material composed of two materials of a carbon material A (reference numeral 18) having supported thereon the catalyst element and a carbon material B (reference numeral 19) not supporting the catalyst element. The catalyst layer is composed of two agglomerates of an agglomerate X (reference numeral 20) containing the carbon material A and the carbon material B as main components and an agglomerate Y (reference numeral 21) containing the carbon material B as a main component and has a configuration of the agglomerate Y being dispersed in the agglomerate X that is a continuum.

Figure 14:
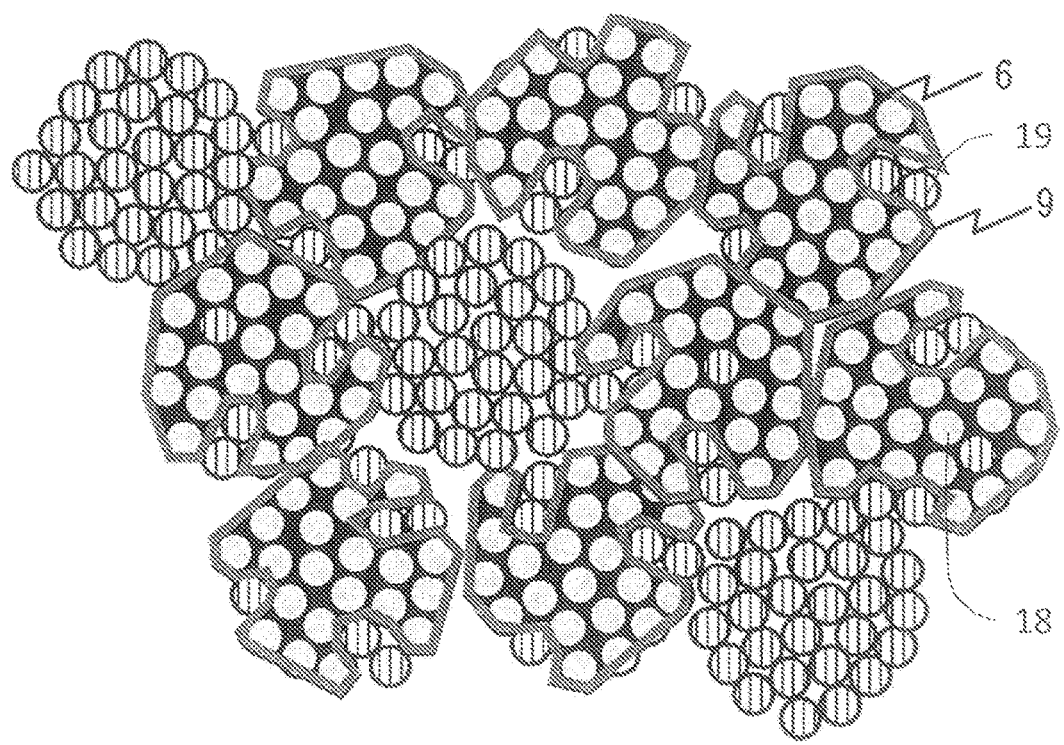
FIG. 14 An explanatory view (enlarged view) illustrating a rough configuration of the catalyst layer according to the present invention.
Figure 15:
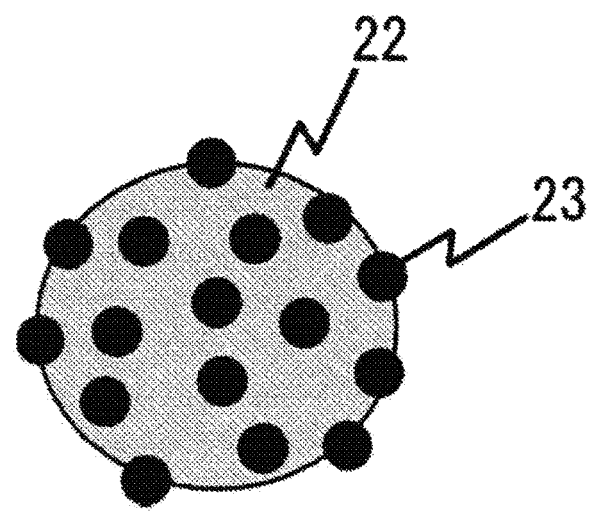
FIG. 15 An explanatory view (enlarged view) illustrating a rough configuration of the hydrophilic carbon material (carbon material A) having supported thereon a catalyst element according to the present invention.

When an aqueous electrolyte solution 6 penetrates into the catalyst layer depicted in FIG. 13, as illustrated in FIG. 14, an interface 9 between the aqueous electrolyte solution and air, in which formation of a triple phase boundary can be expected, is formed. In this embodiment, the carbon material B (hydrophobic carbon material) is dispersed inside the agglomerate X, and the area of the interface 9 between the aqueous electrolyte solution and air is therefore increased. As a result, a number of catalyst elements can be disposed in the triple phase boundary. Here, the carbon material A (reference numeral 18 in FIGS. 13 and 14) having supported thereon a catalyst element is a composite material in which, as illustrated in FIG. 15, a catalyst element 23 is fixed (hereinafter, sometimes referred to as "supported") on the surface as well as in micropores of the carbon material A (reference numeral 22 in FIG. 15).

Although details are described later, in one embodiment of the present invention, the proportion of the micropore surface area in the total surface area of the carbon material A is dominating. In such an embodiment, a number of catalyst elements 23 are supported in micropores of the carbon material A.

Here, the agglomerate X contains the catalyst element, the carbon material A and the carbon material B as main components. Specifically, the total mass of the catalyst element, the carbon material A and the carbon material B is more than 50 mass % relative to the total mass of the agglomerate X. The agglomerate Y contains the carbon material B as a main component. Specifically, the agglomerate Y contains more than 50 mass % of the carbon material B relative to the total mass of the agglomerate Y.

The agglomerate as used in the present invention indicates a state where primary particles of the catalyst element or single particles of the carbon material are agglomerated by van der Waals force, Coulomb force, etc., and one lump (agglomerate) formed in the catalyst layer, in which primary particles of the catalyst element or single particles of the carbon material are put together in the state above, is called as an agglomerate. Each of components in the present invention has a necessary function as a component of the catalyst layer. The catalyst element has a function as a catalyst, and the carbon material has a function as an electron conductor. In particular, as for the carbon material, two kinds of carbon materials of carbon material A and carbon material B are used differently, and in addition to the function as an electron conductor, the carbon material A has a function of supporting a catalyst element and a function of allowing an aqueous electrolyte solution to penetrate into the catalyst layer, whereas the carbon material B has a function of efficiently diffusing air. The configuration having two agglomerates in the catalyst layer of the present invention makes it possible to effectively bring out the functions of the catalyst element, the carbon material A and the carbon material B and form a triple phase boundary required of the positive-electrode catalyst layer of the metal-air battery at a high level.

Firstly, the carbon material B is dispersed as the agglomerate Y in the form of one lump in the catalyst layer, whereby surface properties or three-dimensional structure of the carbon material B are maximized and a continuous air transfer path is easily formed in the catalyst layer. More specifically, a single particle itself of the carbon material B has a well grown three-dimensional structure and has a space in the three-dimensional structure and when carbon materials B are agglomerated with each other, the spaces in three-dimensional structure can be three-dimensionally connected, so that with a smaller amount than in the case of dispersing single particles in the catalyst layer, a large path facilitating diffusion of air in the catalyst layer can be grown.

Secondly, in the catalyst layer of the present invention, the carbon material A having an affinity for an aqueous electrolyte solution is caused to support a catalyst element, be contained in one agglomerate X and form a continuum in the catalyst layer, whereby an aqueous electrolyte solution can be put into contact with substantially all catalyst elements contained in the catalyst layer. More specifically, the carbon material A having an affinity for an aqueous electrolyte solution is forming a continuum in the catalyst layer, so that an aqueous electrolyte solution put into contact from the separator side of the catalyst layer can penetrate into the catalyst layer through the surface of the carbon material A and penetrate the entire region of the catalyst layer.

In one embodiment of the present invention, the proportion of the micropore surface area in the total surface area of the carbon material A is dominating. In such an embodiment, the catalyst element is supported mainly in micropores of the carbon material A to which the aqueous electrolyte solution spreads, but by virtue of a configuration of the depth of the micropore itself being shallow, the aqueous electrolyte solution can easily contact also with the catalyst element in micropores.

In another embodiment of the present invention, a carbon material not dominated by the micropore surface area may be selected as the carbon material A. In this another embodiment, the catalyst element is supported on the surface of the carbon material A to which the aqueous electrolyte solution spreads, so that the aqueous electrolyte solution can be effectively put into contact with the catalyst element.

Thirdly, the carbon material B is finely dispersed in the agglomerate X in which the carbon material A having supported thereon a catalyst element is present, whereby oxygen in air can be effectively supplied to the catalyst element contained in the catalyst layer. If the carbon material B not having an affinity for an aqueous electrolyte solution is not contained in the agglomerate X, an interface between the aqueous electrolyte solution penetrated into the catalyst layer and air diffused from the atmosphere is limited to the interface portion between the agglomerate X and the agglomerate Y, and the catalyst element participating in the progress of a discharge reaction is consequently limited to the interface portion. By finely dispersing the carbon material B in the agglomerate X, a pore being fine but allowing for diffusion of air can be formed in the agglomerate X, and air diffusing through a large path formed in the agglomerate Y can be further diffused efficiently to the catalyst element present inside the agglomerate X.

In the catalyst layer of the present invention, it is preferred that the percentage content $\alpha$ of the carbon material B on the negative electrode-facing side in the catalyst layer is from 0 mass % to less than 20 mass % and the percentage content $\beta$ of the carbon material B on the open-to-air side in the catalyst layer is from more than 10 mass % to less than 50 mass %. When $\alpha<\beta$ is satisfied, the interface area between the aqueous electrolyte solution penetrated into the catalyst layer and the diffused air tends to advantageously increase in the catalyst layer.

The catalyst layer may have a configuration consisting of two or more multiple layers and may have a configuration where the percentage content $\alpha$ of the carbon material B in a first layer on the negative electrode-facing side is from 0 mass % to less than 20 mass % and the percentage content $\beta$ of the carbon material B in a second layer on the open-to-air side is from more than 10 mass % to less than 50 mass %. The catalyst layer may also have a configuration where a single layer or a plurality of layers, each of the layers having a percentage content of the carbon material B set to be intermediate between the first layer and the second layer, are sandwiched by the first layer and the second layer.

Alternatively, the catalyst may not have a distinct layer configuration but have a configuration where the percentage content of the carbon material B contained in the catalyst layer is continuously changed from the negative electrode-facing side to the open-to-air side. However, in the case of a configuration where the percentage content of the carbon material B is continuously changed, if the percentage content $\alpha$ of the carbon material B is 20 mass % or more, the network of the aqueous electrolyte solution penetrated into the catalyst layer may become poor and the effect of increasing the area of the interface between the aqueous electrolyte solution and the air may be hardly obtained. In addition, if the percentage content $\beta$ is 10 mass % or less, the network of the carbon material B in the catalyst layer tends to be limited to the open-to-atmosphere side, and if it is 50 mass % or more, the carbon material B may disadvantageously fail in forming a dispersed configuration on the open-to-atmosphere side of the catalyst layer. Furthermore, if $\alpha$ is not less than $\beta$, a portion which has a poor network of the aqueous electrolyte solution or the air may be appeared in the catalyst layer, and this is not preferred.

The main components of the catalyst layer of the present invention are the catalyst element, the carbon material A and the carbon material B, but for the purpose of complementing each agglomerate configuration of the agglomerate X and the agglomerate Y and increasing the mechanical strength of the catalyst layer, a binder material may be incorporated. The binder material may be used in either one of the agglomerate X and the agglomerate Y or may be used in both. A preferable binder material is a polymer material. The polymer material is not particularly limited as long as it is a material capable of complementing the agglomerate configuration by connecting and fixing components contained in each of the agglomerate X and the agglomerate Y. As for particularly preferable examples, polymers such as polytetrafluoroethylene or perfluorocarbons having a configuration in which a side chain having a functional group is connected to a main chain of polytetrafluoroethylene are preferred, because change in quality due to a chemical reaction is less likely to occur and the effect on an electrode reaction can be minimized.

The percentage content of the binder material in the catalyst layer is preferably from 0 mass % to less than 30 mass %. Within this range, formation of the intended agglomerate configuration of the present invention can be complemented, and the mechanical strength of the catalyst layer can be increased. Many of such polymers are an insulator and even if the polymer has electrical conductivity, they often become to be low conductive materials compared with the electrical conductivity of a carbon material. Accordingly, if the content of the binder material is 30 mass % or more, the polymer may enter the contact interface between carbon materials and divide the electron conduction path to lower the electrical conductivity of the catalyst layer as a whole and cause IR loss, reducing the battery performance.

[Configuration of Agglomerate X]

The configuration of the agglomerate X contained in the catalyst layer of the present invention is preferably a configuration in which the carbon material A having supported thereon a catalyst element forms a continuous configuration and the carbon material B is finely dispersed in the continuous configuration. By virtue of this configuration being formed additionally in the inside of the agglomerate X forming a continuum in the catalyst layer, the carbon material A can take on a configuration continuing over the entire region of the catalyst layer. As a result, the aqueous electrolyte solution coming into contact from the outside of the catalyst layer can propagate on the carbon material surface A to wet the surfaces of all carbon materials A in the catalyst layer and in turn, can efficiently contact with the catalyst element supported on the carbon material A. On the other hand, as for the carbon material B contained in the agglomerate X, a space in the three-dimensional structure of the carbon material B forms a fine air diffusion path in the agglomerate X. In the catalyst layer, air outside the electrode can be diffused into the inside of the catalyst layer through a large air diffusion path formed by the agglomerate Y and further supplied to the catalyst element contained in the agglomerate X through a fine diffusion path formed by the carbon material B in the agglomerate X, and the air can thereby be efficiently diffused to the carbon component contained in the agglomerate X, as a result, the catalyst element contained in the catalyst layer can be effectively utilized.

Accordingly, the preferable percentage content of the carbon material B contained in the agglomerate X of the present invention is not limited as long as at least the continuous configuration of the carbon material A is not divided in the agglomerate X. The percentage content of the carbon material B in the agglomerate X is preferably from 0.1 to 0.5 in terms of the mass ratio (mass of carbon material B)/(mass of carbon material A+mass of carbon material B) excluding the catalyst element. If the percentage content is less than 0.1, the effect obtained by finely dispersing the carbon material B in the agglomerate X is less likely to be exerted, and if it exceeds 0.5, the carbon material A may be surrounded by the carbon material B inside the agglomerate X, leaving the possibility that the aqueous electrolyte solution cannot be contacted with the catalyst element supported on the carbon material A and sufficient battery performance may not be obtained.

[Configuration of Agglomerate Y]

The configuration of the catalyst layer of the present invention can be confirmed by observing the cross-section thereof. This is a method where a cutting surface at an arbitrary angle in an arbitrary place of the catalyst layer is prepared and the cross-section thereof is observed to thereby confirm that a carbon material having not supported thereon a catalyst element forms an agglomerate. The agglomerate above corresponds to the agglomerate Y of the present invention.

At least one catalyst element-free carbon material agglomerate (agglomerate Y) which does not have a size of 300 nm or more in terms of the equivalent-circle diameter is preferably present in a visual field of 10 μm×10 μm in the cross-section of the catalyst layer. If the number of the carbon material agglomerates contained is less than 1, the carbon material A and the carbon material B are averagely mixed during preparation of the catalyst layer or the percentage content of the carbon material B not supporting a catalyst element is too low and since the intended agglomerate Y of the present invention is therefore not formed by the carbon material B, an air transport path is ungrown in the catalyst layer, leading to poor air diffusibility, and among others, stable discharge performance cannot be expressed. More preferably, at least one catalyst element-free carbon material agglomerate (agglomerate Y) which does not have a size of 500 nm or more in terms of the equivalent-circle diameter is present in the same visual field. With the configuration above, the discharge performance is at least kept from becoming unstable, and stable discharge performance is obtained.

The method for forming a cross-section of the catalyst layer is not particularly limited but includes, for example, a method of cutting the catalyst layer by means of a cutter knife or a pair of scissors. In the case where a binder component is not contained in the catalyst layer or the amount of the binder component is small and the catalyst layer is brittle, the catalyst layer may be cut after reinforcing it by using a resin such as epoxy not to break the configuration. A particularly preferable method is a method of forming a cutting surface of the catalyst layer by using a cryomicrotome, etc., in an environment cooled with liquid nitrogen. This is a method of setting the catalyst layer as a sample in a cryomicrotome, cutting the catalyst layer surface by means of a trimming knife made of diamond or glass, and observing the cutting surface.

As the method for observing the cross-section of the catalyst layer, a scanning electron microscope enabling observation of the same visual field by both a secondary electron image and a reflected electron image and enabling observation at least at a magnification of 10,000 times or more is preferred. In a secondary electron image, information about surface topography of the cross-section of the catalyst layer is reflected and the presence of a carbon material or pores can be confirmed. When a high precision electron microscope is used, the presence of a catalyst element can be confirmed, and when a reflected electron image of the same visual field is observed, information on the distribution of ingredients is reflected. For example, in the case where a metal is used for the catalyst element, an image in which the catalyst element looks bright and a catalyst element-free portion shows a dark contrast is obtained. When a secondary electron image and a reflected electron image of the catalyst layer of the present invention are compared, in the same visual field, a carbon material is present in a secondary electron image, nevertheless, a portion showing a dark contrast, i.e., a carbon material absent a catalyst element, is recognized. In a preferred embodiment of the present invention, the equivalent-circle diameter of the outer circumference of this portion, i.e., the portion of a carbon material absent a catalyst element, is 300 nm or more.

An example where the presence of a catalyst element-free carbon material agglomerate (agglomerate Y) having a size of 300 nm or more in terms of the equivalent-circle diameter can be distinguished more quantitatively is described below. A reflected electron image is scanned at a magnification of 10,000 times and a resolution of 272 DPI×272 DPI or more with brightness of 256 levels. The brightness of the scanned image is binarized using an image analysis software to display the range from dark to the 110th level by black and the range from the 111th level toward bright to the 256th level by white. In this state, a large number of black points isolated like islands are appeared, and in order to clarify the targeted range, dilation processing of each black point is therefore once performed to recognize adjacent points. Furthermore, hole-filling processing is conducted to fill blank portions in the range and recognize the same range. Finally, erosion processing for returning the dilated portion to the original is performed to clarify the targeted range. After this, the equivalent-circle diameter of each black portion is calculated from the area of each black portion, and portions of less than 300 nm are all cut. When the remaining black portions include a portion where a carbon material is present in the secondary electron image, this is a preferred embodiment of the present invention.

In the present invention, it is not necessary to satisfy the specified range of the present invention by observing the catalyst element-free carbon material agglomerate (agglomerate Y) by means of all of the analysis methods above, and when the value obtained by one analysis method satisfies the specified range of the present invention, the effect is obtained.

[Catalyst Element for Use in the Present Invention]

The catalyst element for use in the present invention is not limited as long as it is a component allowing at least an oxidation-reduction reaction to proceed on the catalyst element. When at least an oxygen-reduction reaction proceeds, the function as a primary battery can be exerted. In the case of causing the battery to function as a secondary battery, a component additionally having a function of allowing an oxygen generation reaction to proceed on the catalyst element, or a component obtained by compounding a component of allowing an oxidation-reduction reaction to proceed with a component of allowing an oxygen generation reaction to proceed, may be used. Preferable examples of the catalyst element include a metal such as platinum, palladium, ruthenium, gold, silver, rhodium, osmium, iridium, nickel, iron, cobalt, molybdenum and manganese, a composite or an alloy obtained by compounding two or more kinds of these metals, a complex of such a metal and an organic compound or an inorganic compound, and a metal oxide. In addition, a component obtained by compounding two or more kinds thereof may also be used.

[Carbon Material for Use in the Present Invention]

Both the carbon materials A and B must have electron conductivity but are preferably not formed of a carbon material which undergoes a chemical reaction with air, aqueous electrolyte solution, and other battery constituent materials or causes elution of a substance contained in the carbon material upon contact with aqueous electrolyte solution. In the present invention, a chemically stable carbon material is preferably used. Examples of this carbon material include carbon compounds such as carbon black, graphite, carbon fiber, activated carbon, etc., ground products thereof, carbon nanofiber, carbon nanotube, and graphene. One of these preferable carbon materials or a mixture of two or more kinds thereof may be used for the carbon materials A and B. In addition, the carbon material may have a shape where the configuration is elaborated using various template.

[Carbon Material A]

The carbon material A, which is the carbon materials used in the present invention, has a function of allowing an aqueous electrolyte solution to penetrate into the catalyst layer, in addition to the function of supporting a catalyst element. In order to facilitate penetration of an aqueous electrolyte solution into the catalyst layer through the surface of the carbon material A, it is preferable to enhance wettability between the carbon material A and the aqueous electrolyte solution. This wettability can be judged by the water vapor adsorption amount under given conditions. In order to effectively bring out the function above, when a carbon material having a water vapor adsorption amount of 0.1 $cm^3/g$ or more at 25° C. and a relative humidity of 10% (i.e., a relative pressure of 0.1) is selected for the carbon material A, the affinity for the aqueous electrolyte solution is elevated to facilitate penetration of the aqueous electrolyte solution into the catalyst layer through the surface of the carbon material A. As a result, the catalyst element supported on the surface of the carbon material A and the aqueous electrolyte solution can be efficiently put into contact with each other, and $OH^-$ ion necessary for the catalyst element to function can be efficiently delivered/received. Accordingly, higher wettability of the carbon material A of the present invention with the aqueous electrolyte solution is better, and the upper limit value of the water vapor adsorption amount at 25° C. and a relative humidity of 10% is not particularly limited. As to the substantial upper limit value of the water vapor adsorption amount at 25° C. and a relative humidity of 10%, for example, the substantial upper limit value may be about 10 $cm^3/g$ that is thought to be obtained in activated carbon having a very high specific surface area.

If the water vapor adsorption amount of the carbon material A at 25° C. and a relative humidity of 10% is less than 0.1 $cm^3/g$, the aqueous electrolyte solution may not penetrate into the catalyst layer and since a catalyst element incapable of being put into contact with the aqueous electrolyte solution is readily prepared in the catalyst layer, a sufficient electrode reaction may not proceed. When a carbon material having a water vapor adsorption amount of 0.2 $cm^3/g$ or more at 25° C. and a relative humidity of 10% is selected, irrespective of the surface area or three-dimensional structure of the carbon material, the aqueous electrolyte solution can be more unfailingly caused to penetrate into the catalyst layer and most of the catalyst element can contact with the aqueous electrolyte solution. Therefore, the function of the catalyst element can be effectively brought out.

The water vapor adsorption amount at 25° C. and a relative humidity of 10% is shown by converting the amount of water vapor adsorbed per 1 g of the carbon material placed in an environment of 25° C. to the water vapor volume in the standard state. The water vapor adsorption amount at 25° C. and a relative humidity of 10% can be measured using a commercially available water vapor adsorption amount-measuring apparatus.

As the carbon material A, at least one material of a carbon material dominated by the proportion of the micropore surface area in the total surface area and a carbon material not dominated by the proportion of the micropore surface area in the total surface area can be used. As the carbon material A, a mixture of a carbon material dominated by the proportion of the micropore surface area in the total surface area and a carbon material not dominated by the proportion of the micropore surface area in the total surface area may also be used.

However, in order to efficiently diffuse air while putting the aqueous electrolyte solution into contact with the catalyst element supported on the carbon material A, the conditions that the carbon material A must satisfy need to be changed depending on whether the proportion of the micropore surface area in the total surface area of a carbon material constituting the carbon material A is dominating or not.

(In Case of Carbon Material A Dominated by Proportion of Micropore Surface Area in Total Surface Area)

In the case of using a carbon material A dominated by the proportion of the micropore surface area in the total surface area, the depth of the micropore is made shallow, whereby air can be efficiently diffused while putting the aqueous electrolyte solution into contact with the catalyst element supported on the carbon material A. Accordingly, it is preferable to satisfy all of the following conditions, more specifically, the conditions that the three-dimensional structure of the carbon material A is not grown; the micropore surface area in the total surface area of the carbon material A is dominating; the average particle diameter of the carbon material A is small; and the particle diameter distribution of the carbon material A is sharp. Here, the carbon material A which is "dominated by the micropore surface area in the total surface area" is a carbon material in which the ratio $S_{micro}/S_{total}$ of the micropore surface area $S_{micro}$ as determined by t-plot analysis of a nitrogen adsorption isotherm obtained by the evaluation method of BET specific surface area (evaluation method of Brunauer-Emmett-Teller specific surface area) to the total surface area $S_{total}$ is 0.9 or more.

The evaluation method of BET specific surface area as used herein indicates the nitrogen adsorption measurement/evaluation method for nitrogen gas at a liquid nitrogen temperature. As for the specific surface area $S_{micro}$ of a micropore defined as a pore having a diameter of 2 nm or less and the total surface area $S_{total}$ the values calculated by t-plot analysis (Chemical Society of Japan ed., "Colloid Chemistry I", Tokyo Kagaku Dojin, 1995) of a nitrogen adsorption isotherm obtained by the evaluation method of BET surface area are used.

When $S_{micro}/S_{total}$ of the carbon material A is 0.9 or more, this means that the three-dimensional structure of the carbon material A is not grown (that is, many of hydrophilic carbon material particles are present as a primary particle) and the micropore surface area in the total surface area of the carbon material A is dominating. In the case where the three-dimensional structure of the carbon material A is not grown, particles of the carbon material A are densely disposed. In turn, the bulk density of the carbon material A becomes high.

On the other hand, if $S_{micro}/S_{total}$ of the carbon material A is less than 0.9, the carbon material A has a well grown three-dimensional structure. More specifically, in this case, the carbon material A has a complicated three-dimensional structure in which a large number of primary particles are connected, and a large number of catalyst elements are supported on the surface of the three-dimensional structure. In turn, the carbon material A comes to have a very bulky configuration, i.e., the bulk density decreases. When a catalyst layer composed of a carbon material A having an ungrown three-dimensional structure and a catalyst layer composed of a carbon material A having a well grown three-dimensional structure are compared under the same specific surface area, the thickness of the catalyst layer composed of a carbon material A having an ungrown three-dimensional structure is small, and the air diffusion path is therefore short, so that air can be efficiently diffused. As a result, the air diffusion resistance during large current density discharge decreases, and the battery properties during large current density discharge are consequently improved.

Here, from the standpoint of maximally increasing the catalyst present in a triple phase boundary, as much air or electrolytic solution as possible needs to be contacted with the catalyst within micropores. However, if the depth of the micropore is too deep, air or the electrolytic solution can hardly reach the catalyst disposed in the deep part of the micropore. For this reason, if the depth of the micropore is too deep, an inefficient metal-air battery results. Accordingly, the average particle diameter of the carbon material A is preferably small. Specifically, the average particle diameter of the carbon material A is preferably less than 1.5 μm. Here, the particle diameter of the carbon material A is a diameter obtained from the assumption that the carbon material A is regarded as a sphere, and the average particle diameter is d50, i.e., a particle diameter wherein the cumulative value in the particle size distribution (so-called cumulative size distribution) reaches 50%. When the average particle diameter of the carbon material A is small, the depth of the micropore is not extremely deep, and this makes it easy for air or the electrolytic solution to enter the micropore.

Furthermore, in the case of using a carbon material A dominated by the proportion of the micropore surface area in the total surface area, the particle diameter distribution of the carbon material A is sharp. If the particle size distribution is too broad, a hydrophilic carbon material having a small particle diameter may cause clogging of the catalyst layer (particularly the agglomerate X). In this case, air can hardly diffuse into the catalyst layer. As a result, the air diffusion resistance increases during large current density discharge and in turn, the battery properties, particularly the battery properties during large current density discharge, are reduced. Accordingly, in the carbon material A, the ratio (d90–d10)/d50 of the difference between d90 and d10 (d90–d10) to d50 is preferably less than 1.0. Here, d10 is a particle diameter wherein the cumulative value in the particle diameter distribution as measured by the later-described method reaches 10% from the small side, and d90 is a particle diameter wherein the cumulative value reaches 90% from the small side. In this case, the carbon material A contains substantially no particle having an extremely small particle diameter, and clogging of the catalyst layer can thereby be prevented. The method for measuring the particle diameter distribution of the carbon material A is not particularly limited. The method for measuring the particle diameter distribution includes, for example, a method of observing and measuring an image acquired by SEM (scanning electron microscope) or TEM (transmission electron microscope), a gravitational settling method, a laser diffraction method, and a dynamic light scattering method, and the method may be selected according to the properties of the carbon material A as a measurement target.

In the case of the carbon material A dominated by the proportion of the micropore surface area in the total surface area, among the substances recited as the preferable carbon material for use in the present invention, activated carbon is particularly preferred. In activated carbon, a three-dimensional structure is not grown and a micropore is grown in many cases, which makes it easy for $S_{micro}/S_{total}$ to become 0.90 or more.

(In Case of Carbon Material a not Dominated by Micropore Surface Area in Total Surface Area)

In the case of using a carbon material A not dominated by the micropore surface area in the total surface area, the catalyst element is supported on the surface of the carbon material A, whereby air can be efficiently diffused while putting the aqueous electrolyte solution into contact with the catalyst element supported on the carbon material A. Here, in the carbon material A "not dominated by the micropore surface area in the total surface area", the ratio $S_{micro}/S_{total}$ of the micropore surface area $S_{micro}$ as determined by t-plot analysis of a nitrogen adsorption isotherm obtained by the evaluation method of BET specific surface area (evaluation method of Brunauer-Emmett-Teller specific surface area) to the total surface area $S_{total}$ is 0.9 or less.

When the aqueous electrolyte solution penetrates into the catalyst layer, the aqueous electrolyte solution enters micropores of the carbon material A as well, and it is sometimes difficult for air to diffuse to the catalyst element present inside the micropore. In practice, a good amount of oxygen that diffuses in the aqueous electrolyte solution and undergoes reaction is assumed to exist, and the catalyst element located near the inlet of the micropore may be therefore estimated to function. However, if the proportion of micropores is extremely high, when the carbon material A does not satisfy the above-described conditions, such as three-dimensional structure and particle diameter distribution, the catalyst element is substantially unable to function. In such a case, the proportion of the catalyst element existing, for example, deep in the micropore, to which oxygen is substantially unable to diffuse, and failing in contributing to the electrode reaction is increased, and satisfactory battery performance may not be obtained for the amount of the catalyst supported.

On the other hand, when a carbon material A in which the ratio $S_{micro}/S_{total}$ of the micropore surface area $S_{micro}$ to the total surface area $S_{total}$ is 0.9 or less, is selected, the proportion of the catalyst element substantially incapable of contributing to the electrode reaction can be reduced. If the ratio $S_{micro}/S_{total}$ exceeds 0.9, the proportion of the catalyst element with which the electrode reaction does not substantially proceed is increased, and economically satisfactory battery performance for the amount of the catalyst used in the electrode can be hardly obtained. A method of selecting a carbon material A in which the ratio $S_{micro}/S_{total}$ is next to zero, and completely eliminating the catalyst element that does not substantially function, may be conceived in theory, but a carbon material in which the ratio $S_{micro}/S_{total}$ is substantially next to zero, i.e., a carbon material in which micropore analysis by the above-mentioned t-plot analysis is difficult, tends to have a too small surface area. Further, when the catalyst element is attempted to be supported at a high density, it is likely that the catalyst element provides an excessively large particle diameter or is aggregated and unevenly supported on the carbon material A and satisfactory battery performance is not obtained. More preferably, a carbon material A in which the ratio $S_{micro}/S_{total}$ is between less than 0.8 and 0.05 or more is selected, and in this case, the catalyst element incapable of contributing to the electrode reaction exerts substantially no effect on the battery performance, the catalyst element is likely to be supported in a finely dispersed state, and an efficient battery capable of exhibiting the expected battery performance with the amount of the catalyst element used can be obtained.

In the case of the carbon material A not dominated by the micropore surface area in the total surface area, when the carbon material A has a three-dimensional structure grown to a certain degree, the surface area other than the pore portion of the carbon material, i.e., the outer surface area, tends to increase. This is advantageous in that oxygen in air or OH⁻ ion in the aqueous electrolyte solution is readily diffused to the catalyst element on the carbon material surface and expression of high battery performance can be expected with a small catalyst amount. The degree of such growth of three-dimensional structure can be judged by the relationship between the DBP absorption and the specific surface area, though there is a method of observing the carbon material by an electron microscope and determining the degree of growth of three-dimensional structure.

The DBP absorption as used herein means the amount of dibutyl phthalate absorbed by a carbon material when dibutyl phthalate is brought into contact with a unit mass of carbon material. Dibutyl phthalate (hereinafter, simply referred to as "DBP") is absorbed mainly in an interstice between primary particles and therefore, there is a tendency that when the three-dimensional structure is grown, the DBP absorption becomes large and when the three-dimensional structure is not well grown, the DBP absorption becomes small. However, since DBP is absorbed also in fine pores formed inside the primary particle, other than in an interstice between primary particles, the DBP absorption does not directly indicate the degree of growth of three-dimensional structure. This is because of the tendency that when the specific surface area as measured by the nitrogen adsorption is large, the amount of DBP absorbed in fine pores increases and in turn, the DBP absorption of the entirety also increases. In a carbon material having a highly grown three-dimensional structure, the DBP absorption therefore becomes large for the nitrogen adsorption, more specifically, the DBP absorption is large even when the nitrogen adsorption is small. Conversely, in a carbon material having an ungrown three-dimensional structure, the DBP absorption is small for the nitrogen adsorption, more specifically, the DBP absorption is small even when the nitrogen adsorption is large.

When a carbon material in which the ratio $X/S_{BET}$ of the DBP absorption X ml/100 g to the specific surface area $S_{BET}$ m²/g by BET specific surface area evaluation is 0.05 or more is used for the carbon material A, oxygen in air or OH⁻ ion in the aqueous electrolyte solution is readily diffused and a high-performance catalyst layer expressing high battery performance with a small catalyst amount can be obtained. If the ratio $X/S_{BET}$ is less than 0.05, the proportion of the outer surface area decreases, and oxygen in air or OH⁻ ion in the aqueous electrolyte solution can hardly diffuse, as a result, it may be difficult to stably bring out the performance of the catalyst layer with a small catalyst amount. If the ratio exceeds 3.0, the mechanical strength may be reduced and when the catalyst layer is incorporated into a battery and used, the three-dimensional structure may be broken, failing in obtaining the expected battery performance may.

[Carbon Material B]

Among the carbon materials used in the present invention, the carbon material B is contained in a catalyst layer which is caused to function by penetration of an aqueous electrolyte solution, and this carbon material thereby ensures a region into which the aqueous electrolyte solution does not penetrate, and forms a path for allowing air containing oxygen necessary for the discharge reaction to diffuse to the catalyst layer. Accordingly, the carbon material B is preferably a material that is less wettable to the aqueous electrolyte solution.

When a carbon material having a water vapor adsorption amount of less than 0.1 $cm^3/g$ at 25° C. and a relative humidity of 10% is selected as the carbon material B, the affinity for the aqueous electrolyte solution is low, and the surface of the carbon material B is less likely to be wetted with the aqueous electrolyte solution, making it easy for air to be present near the carbon material B. If a carbon material having a water vapor adsorption amount of 0.1 $cm^3/g$ or more is selected as the carbon material B, a discharge reaction does not efficiently proceed in many cases. This is presumed to occur because the affinity for the aqueous electrolyte solution is high and the carbon material B is partially wetted with the aqueous electrolyte solution, forming a poor air diffusion path in the catalyst layer.

On the other hand, when a carbon material B having a water vapor adsorption amount of less than 0.05 $cm^3/g$ at 25° C. and a relative humidity of 10% is selected, air can be more unfailingly caused to be present around the carbon material B, and high battery performance can be obtained. The carbon material B is also considered to be ideally a material having substantially little affinity for the aqueous electrolyte solution, i.e., a material in which the water vapor adsorption amount at 25° C. and a relative humidity of 10% is substantially 0.

As the material in which the water vapor adsorption amount at a relative humidity of 10% is substantially 0, a carbon material having a substantially ungrown three-dimensional structure, or a carbon material having substantially no surface functional group contributing to affinity for the aqueous electrolyte solution or substantially no fine surface unevenness configuration, for example, a carbon material prepared through a very high-cost graphitization step, may be expected. However, in a metal-air battery using a carbon material having a substantially ungrown three-dimensional structure, the battery performance is not as high as it is expected. A metal-air battery using a carbon material prepared through a very high-cost graphitization step is assumed to be economically disproportionate. From these viewpoints, the lower limit of the water vapor adsorption amount at 25° C. and a relative humidity of 10% is assumed to be about 0.01 $cm^3/g$.

The carbon material B preferably has a well grown three-dimensional structure, because air can be held in the configuration of the carbon material B. Among others, in the agglomerate Y, the carbon materials B are agglomerated with each other, and the spaces in three-dimensional structures can thereby be three-dimensionally connected, so that with a smaller amount than in the case of dispersing single particles in the catalyst layer, a large path facilitating diffusion of air in the catalyst layer can be grown. In addition, the space in the three-dimensional structure of the carbon material B finely dispersed as single particles can function as a fine air diffusion path also inside the agglomerate X.

Examples of the preferable material of the carbon material B include carbon compounds such as carbon black, graphite, carbon fiber, activated carbon, etc., ground products thereof, carbon nanofiber, carbon nanotube, and graphene. In addition, a carbon material having a configuration that is elaborated using various template may be used. A mixture of two or more kinds thereof may also be used. Furthermore, the carbon material may be used by changing the kind or composition between the carbon material B dispersed in the agglomerate X and the carbon material B as a main component of the agglomerate Y. The more preferable material of the carbon material B is, for example, carbon black. In carbon black, a plurality of primary particles are fused together to form a three-dimensional structure called as "structure". Depending on the kind of carbon black, well grown structure provides a configuration where connected primary particles hold spaces. When a carbon material B having such a configuration is used, the spaces held advantageously provide a gas diffusion path. The degree of growth of three-dimensional structure can be judged by the relationship between the DBP absorption and the specific surface area, though there is a method of observing the carbon material by an electron microscope and determining the degree of growth of three-dimensional structure.

When a carbon material in which the ratio $X/S_{BET}$ of the DBP absorption X ml/100 g to the specific surface area $S_{BET}$ $m^2/g$ by BET specific surface area evaluation is 0.5 or more is used for the carbon material B, a gas diffusion path is readily ensured, and a high-performance catalyst layer can be obtained. If the ratio $X/S_{BET}$ is less than 0.5, the space as a gas diffusion path are poor, and it may be difficult to stably bring out the performance of the catalyst layer. If the ratio exceeds 3.0, the mechanical strength may be reduced and when the catalyst layer is incorporated into a battery and used, the three-dimensional structure may be broken, failing in obtaining the expected battery performance. In particular, when $X/S_{BET}$ is 1.0 or more, the space held in the carbon material is sufficiently large, and a large gas diffusion path can be unfailingly formed, so that stable battery performance can be obtained.

In the catalyst layer of the present invention, the preferable percentage content of the carbon material B is affected by the kind of the carbon material A, the distribution factor of the agglomerate X and the agglomerate Y, and the kind, supported rate on the carbon material A and particle diameter of the catalyst element. Accordingly, the preferable percentage content of the carbon material B also slightly varies depending on whether, as described above, the proportion of the micropore surface area of the carbon material constituting the carbon material A in the total surface area of the carbon material is dominating or not.

(1) In the case of using the carbon material A wherein the proportion of the micropore surface area in the total surface area is dominating, the percentage content of the carbon material B in the catalyst layer is preferably from more than 10 mass % to less than 50 mass %. Out of this range, the catalyst layer configuration proposed in the present invention may not be formed, and an efficient metal-air battery may not be obtained. For example, if the percentage content is 10 mass % or less, it may be difficult for the carbon material B to form the agglomerate Y effective for air diffusion. For example, if the percentage content is 50 mass % or more, part of the agglomerate X containing the catalyst element may not have a continuous configuration but may be dispersed in the agglomerate Y. The percentage content is more preferably, for example, from more than 10 mass % to 40 mass %, still more preferably, for example, from 30 to 35 mass %.

(2) On the other hand, in the case of using the carbon material A not dominated by the micropore surface area in the total surface area, the percentage content is preferably from 5 mass % to less than 50 mass %. Out of this range, the catalyst layer configuration proposed in the present invention may not be formed, and an efficient metal-air battery may not be obtained. For example, if the percentage content is less than 5 mass %, it may be difficult for the carbon material B to form the agglomerate Y effective for air diffusion. For example, if the percentage content is 50 mass % or more, part of the agglomerate X containing the catalyst element may not have a continuous configuration but may be dispersed in the agglomerate Y. The percentage content is more preferably, for example, from 10 to 40 mass %.

Control of the wettability of the carbon material A or carbon material B contained in the present invention with the aqueous electrolyte solution, i.e., control of the water vapor adsorption amount at 25° C. and a relative humidity of 10%, can be achieved by selecting the carbon material from the carbon materials present in general, based on the water vapor adsorption amount as an indicator. Alternatively, even in the case of a carbon material having a smaller water vapor adsorption amount than the preferable range, the water vapor adsorption amount can be increased to the preferable range by treating the carbon material surface with an acid, a base, etc. or exposing the carbon material to an oxidizing atmosphere environment. Although it is not limited, for example, the carbon material is treated in a warm concentrated nitric acid, dipped in an aqueous hydrogen peroxide solution, heat-treated in an ammonia flow, dipped in a warm aqueous sodium hydroxide solution, heated in KOH or NaOH, or heat-treated in dilute oxygen, dilute NO or $NO_2$, whereby the water vapor adsorption amount can be increased. Conversely, in the case where the water vapor adsorption amount is too large, the water vapor adsorption amount can be decreased to the preferable range by heating the carbon material in an inert atmosphere. Although it is not limited, the water vapor adsorption amount can be decreased, for example, by heat-treating the carbon material in an atmosphere such as argon, nitrogen, helium or vacuum.

[Preparation Method of Catalyst Layer of Air Electrode]

The method for producing the catalyst layer of the air electrode of the metal-air battery of the present invention is not particularly limited as long as the catalyst layer can be prepared such that the agglomerate Y is dispersed in a continuum of the agglomerate X. The catalyst layer can be formed by adding, if necessary, water or an organic solvent to materials containing main components consisting of the carbon material A having supported thereon a catalyst element and the carbon material B to prepare an ink, and drying the ink in a film shape.

Particularly preferable methods for producing the catalyst layer are described below.

(1) In Case of Carbon Material a Wherein Proportion of Micropore Surface Area Dominates in Total Surface Area

[Preparation Method 1-1 of Preferable Catalyst Layer]

(i) First, a carbon material A is ground to reduce the average particle diameter of the carbon material A to less than 1.5 μm. The method for grinding the carbon material A is not particularly limited. The method for grinding the carbon material A includes, for example, a method utilizing ultrasonic waves, and a method of grinding the carbon material by means of a ball mill, glass beads, etc.

(ii) Next, the particle diameter distribution of the carbon material A is adjusted such that the particle diameter distribution of the carbon material A becomes sharp. Specifically, the particle diameter distribution of the carbon material A is adjusted to satisfy the condition of $(d90-d10)/d50<1.0$. The method for adjusting the particle diameter distribution of the carbon material A is not particularly limited. The method for adjusting the particle diameter distribution of the carbon material A includes, for example, a sieving method using a sieve, and a method using an air classifier. The preferable method is a method using an air classifier.

(iii) Subsequently, a catalyst element is supported on the carbon material A.

(iv) Then, the carbon material A having supported thereon a catalyst element and a carbon material B are ground and mixed in a solvent to prepare an ink and after drying the ink, the obtained solid matter is dry-ground to prepare an agglomerate X precursor.

(v) Thereafter, an ink prepared by grinding and mixing a carbon material B in a solvent is dried, and the obtained solid matter is dry-ground to prepare an agglomerate Y precursor. The obtained agglomerate X precursor and agglomerate Y precursor are stirred and mixed in a solvent, and the prepared ink is dried in a film shape to form a catalyst layer.

According to this method, in the agglomerate X precursor and the agglomerate Y precursor, not only a component working out to a binder is contained but also the solid content particles are fixed substantially only by van der Waals force. Accordingly, in the case of dry grinding or stirring/mixing, the strength and time must be adjusted to prevent the agglomerate configuration from becoming too fine. The specific degree of dry grinding or stirring/mixing differs depending on the material, the amount thereof or instrument used and cannot be limited, but the strength or time of dry grinding or stirring/mixing may be adjusted such that one or more catalyst element-free carbon material agglomerates (agglomerate Y) each having a size of 300 nm or more in terms of the equivalent-circle diameter are dispersed in the visual field having an area of 10 μm×10 μm in the cross-section of the obtained catalyst layer. The upper limit value of the number of agglomerate Y in the visual field having an area of 10 μm×10 μm is not particularly limited and may be sufficient as long as the continuous configuration of the agglomerate X is not broken.

[Preparation Method 1-2 of Preferable Catalyst Layer]

(i) First, the average particle diameter and particle diameter distribution of the carbon material A are adjusted in the same manner as in Preparation Method 1 of Preferable Catalyst Layer above.

(ii) Next, a catalyst element is supported on the carbon material A.

(iii) Subsequently, the carbon material A having supported thereon a catalyst element, a carbon material B and polytetrafluoroethylene (PTFE) working out to a binder are ground and mixed in a solvent to prepare an ink, the ink is dried in a film shape and further subjected, if desired, to heat treatment or hot pressing to thermally fuse the carbon material A and the carbon material B together by the binder, and the obtained solid matter is dry-ground to prepare an agglomerate X precursor.

(iv) Thereafter, a carbon material B and PTFE working out to a binder are ground and mixed in a solvent to prepare an ink, the ink is dried in a film shape and further subjected, if desired, to heat treatment or hot pressing to thermally fuse the carbon material B together by the binder, and the obtained solid matter is dry-ground to prepare an agglomerate Y precursor.

(v) The obtained agglomerate X precursor and agglomerate Y precursor are stirred and mixed in a solvent, and the prepared ink is dried in a film shape to form a catalyst layer.

This method is preferred, because the mechanical strength of the agglomerate configuration is increased to prevent the agglomerate from being broken in the course of forming the catalyst layer and the targeted configuration is readily obtained. The agglomerate in which the binder is contained may be only the agglomerate X or only the agglomerate Y. The specific degree of dry grinding or stirring/mixing differs depending on the material, amount or instrument used and cannot be limited, but the strength or time of dry grinding or stirring/mixing may be adjusted such that one or more catalyst element-free carbon material agglomerates (agglomerate Y) each having a size of 300 nm or more in terms of the equivalent-circle diameter are dispersed in the visual field having an area of 10 µm×10 µm in the cross-section of the obtained catalyst layer.

(2) In Case of Using Carbon Material a not Dominated by Micropore Surface Area in Total Surface Area

[Preparation Method 2-1 of Preferable Catalyst Layer]

(i) An ink prepared by grinding and mixing a carbon material A having supported thereon a catalyst layer and a carbon material B is dried, and the obtained solid matter is dry-ground to prepare an agglomerate X precursor.

(ii) Next, an ink prepared by grinding and mixing a carbon material B in a solvent is dried, and the obtained solid matter is dry-ground to prepare an agglomerate Y precursor. The obtained agglomerate X precursor and agglomerate Y precursor are stirred and mixed in a solvent, and the prepared ink is dried in a film shape to form a catalyst layer.

In this method, a component working out to a binder is not contained in the agglomerate X precursor or the agglomerate Y precursor, and the solid content particles are fixed substantially only by van der Waals force. Accordingly, in the case of dry grinding or stirring/mixing, the strength and time must be adjusted to prevent the agglomerate configuration from becoming too fine. The specific degree of dry grinding or stirring/mixing differs depending on the material, the amount thereof or instrument used and cannot be limited, but the strength or time of dry grinding or stirring/mixing may be adjusted such that one or more catalyst element-free carbon material agglomerates (agglomerate Y) each having a size of 300 nm or more in terms of the equivalent-circle diameter are dispersed in the visual field having an area of 10 µm×10 µm in the cross-section of the obtained catalyst layer. The upper limit value of the number of agglomerate Y in the visual field having an area of 10 µm×10 µm is not particularly limited and may be sufficient as long as the continuous configuration of the agglomerate X is not broken.

[Preparation Method 2-2 of Preferable Catalyst Layer]

(i) First, a carbon material A having supported thereon a catalyst element, a carbon material B and PTFE working out to a binder are ground and mixed in a solvent to prepare an ink, the ink is dried in a film shape and further subjected, if desired, to heat treatment or hot pressing to thermally fuse the carbon material A and the carbon material B together by the binder, and the obtained solid matter is dry-ground to prepare an agglomerate X precursor.

(ii) Next, a carbon material B and PTFE working out to a binder are ground and mixed in a solvent to prepare an ink, the ink is dried in a film shape and further subjected, if desired, to heat treatment or hot pressing to thermally fuse the carbon material B together by the binder, and the obtained solid matter is dry-ground to prepare an agglomerate Y precursor. The obtained agglomerate X precursor and agglomerate Y precursor are stirred and mixed in a solvent, and the prepared ink is dried in a film shape to form a catalyst layer.

This method is preferred, because the mechanical strength of the agglomerate configuration is increased to prevent the agglomerate from being broken in the course of forming the catalyst layer and the targeted configuration is readily obtained. The agglomerate in which the binder is contained may be only the agglomerate X or only the agglomerate Y. The specific degree of dry grinding or stirring/mixing differs depending on the material, the amount thereof or instrument used and cannot be limited, but the strength or time of dry grinding or stirring/mixing may be adjusted such that one or more catalyst element-free carbon material agglomerates (agglomerate Y) each having a size of 300 nm or more in terms of the equivalent-circle diameter are dispersed in the visual field having an area of 10 µm×10 µm in the cross-section of the obtained catalyst layer.

[Electrode Configuration of Positive Electrode]

The electrode configuration of the positive electrode in the metal-air battery of the present invention is not particularly limited as long as a catalyst layer is disposed on the negative electrode-facing side, the air in the atmosphere can be diffused from the opposite side, and an aqueous electrolyte solution penetrated into the catalyst layer from the negative electrode-facing side does not leak out to the open-to-atmosphere side. This electrode configuration can be applied to the electrode configuration of the positive electrode in the metal-air battery of the present invention, irrespective of whether the proportion of the micropore surface area of the used carbon material A is dominating in the total surface area of the carbon material A or not.

In general, a two-layer configuration having, on the negative electrode-facing side, the catalyst layer of the present invention and thereon a gas diffusion layer formed of a hydrophobic porous material is preferred. In this case, the current collector may be in contact with at least a part of the two-layer configuration and can be disposed between the catalyst layer and the gas diffusion layer or on the open-to-atmosphere side of the gas diffusion layer. For the current collector, a material that dissolves or causes a change in the electron conductivity under an environment in contact with an aqueous alkali solution is not preferred, and a material that is chemically stable and has small contact resistance with a carbon material is preferred. The current collector is generally a nickel mesh or a nickel-plated stainless steel mesh.

In the case of using the current collector on the open-to-atmosphere side relative to the gas diffusion layer, the gas diffusion layer must be composed of a material having electron conductivity enabling electron conduction between the catalyst layer and the current collector. The gas diffusion layer is required to have a function of, during discharge, taking in air from the open-to-atmosphere side, diffusing it in the gas diffusion layer, and uniformly diffusing the air gas to the catalyst layer, and a function of conducting an electron between the catalyst layer and the current collector, and is not particularly limited as long as it has at least these functions. In general, for example, a carbon material such as carbon cloth and carbon paper is preferred as the main constituent material. A metal material such as metal mesh or metal wool may also be used if it can impart corrosion resistance, in addition to gas diffusibility and electron conductivity. More preferable examples of the configuration of the gas diffusion layer include a two-layer configuration consisting of, on the open-to-atmosphere side of the gas diffusion layer, a gas diffusion fiber layer with the main component being a fibrous carbon material, and on the catalyst layer side, a microporous layer with the main component being carbon black less wettable to water.

In forming the catalyst layer, as for the method to dry an ink containing the catalyst element, the carbon material A and the carbon material B as main components in a film shape, a generally proposed method may be applied, and the method is not particularly limited. For example, in the case of applying the ink onto the gas diffusion layer, the method includes brush coating, spray coating, roll coater, ink jet printing, screen printing, etc. Alternatively, a method wherein the ink is applied by bar coater, brush coating, spray coating, roll coater, ink jet printing, screen printing, etc. and dried to once form a catalyst layer on the surface of a polymer material as a different material such as PTFE sheet or PTFE sheet, and the catalyst layer is then bonded to the gas diffusion layer or a separator by hot pressing or other methods, may also be selected.

EXAMPLES

Examples 1A to 31A and Comparative Examples 1A to 21A

<Preparation of Carbon Material A and Measurement of Physical Properties>

In Examples 1A to 31A of the electrode for a metal-air battery of the present invention, ten kinds of Carbon Materials a1 to j1 were prepared as the carbon material A. Various physical properties of various carbon materials are shown in Table 1 (the kind of carbon material and physical properties thereof).

Carbon Material a1 is a carbon material in which the average particle diameter and the particle diameter distribution were not adjusted, and is used as Comparative Example. Carbon Material b1 is a carbon material in which the average particle diameter and the particle diameter distribution were adjusted. Carbon Material c1 is a carbon material in which the average particle diameter and the particle diameter distribution were adjusted. Carbon Material c1 has a small average particle diameter and a sharp particle diameter distribution and is a best product among the evaluation targets in Examples. Carbon Material d1 is a carbon material in which the average particle diameter and the particle diameter distribution were adjusted. Carbon Material d1 has a slightly low water vapor adsorption amount. Carbon Material e1 is a carbon material in which the average particle diameter and particle diameter distribution were adjusted. Carbon Material e1 has a slightly large nitrogen adsorption specific surface area. Carbon Material f1 is a carbon material in which the average particle diameter was not adjusted and the particle diameter distribution was adjusted. Carbon Material f1 has a sharp particle diameter distribution but has an average particle diameter of 1.5 μm or more. Accordingly, Carbon Material f1 is used as Comparative Example. Carbon Material h1 is a carbon material in which the average particle diameter was adjusted but the particle diameter distribution was not adjusted. Carbon Material h1 has an average particle diameter of less than 1.5 μm but has a broad particle diameter distribution. Accordingly, Carbon Material h1 is used as Comparative Example. These Carbon Materials a1 to h1 are activated carbon. Carbon Materials i1 and j1 are carbon black in which the micropore surface area in the total surface area is not dominating. Accordingly, Carbon Materials i1 and j1 are used as Comparative Examples.

Here, the average particle diameter of the carbon material was adjusted by grinding the carbon material. For the grinding of the carbon material, planetary ball mill P-7 manufactured by Fritsch Japan Co., Ltd. was used. The particle diameter distribution was adjusted by classifying the carbon material. The classification of the carbon material was performed by adjusting the classification edge position of Elbow Jet Classifier manufactured by Nittetsu Mining Co., Ltd. The particle diameter distribution was measured by the laser diffraction method.

As for the nitrogen adsorption specific surface area $S_{BET}$, a sample having been vacuum-dried at 120° C. was measured using an automatic specific surface area measurement device (BELSORP36 manufactured by Bel Japan, Inc.) in nitrogen gas to determine the specific surface area $S_{BET}$ by the one-point method based on the BET method. In the t-plot analysis, the total surface area $S_{total}$ and the micropore surface area $S_{micro}$ were calculated using the analysis program attached to the apparatus. As for the water vapor adsorption amount, a sample measured using a constant volume-type water vapor adsorption apparatus (BELSORP18 manufactured by Bel Japan, Inc.) and subjected to deaeration pretreatment at 120° C. and 1 Pa or less for 2 hours was held in a 25° C. constant-temperature bath, and the water vapor adsorption amount was measured by gradually supplying water vapor to give a stepwise change to the relative humidity between a vacuum state and the saturated steam pressure of water vapor at 25° C. An adsorption isotherm was drawn from the obtained measurement results, and the water vapor adsorption amount at a relative humidity of 10% was determined from the graph. In Table 1, the determined water vapor amount which was converted to the volume of water vapor being adsorbed per g of the sample in the standard state is shown.

TABLE 1

| Kind of Carbon Material | Specific Surface Area $S_{BET}$ (m²/g) | Total Surface Area $S_{total}$ (m²/g) | Micropore Surface Area $S_{micro}$ (m²/g) | Average Particle Diameter d50 (μm) | d10 (μm) | d90 (μm) | d90 − d10 | (d90 − d10)/d50 | Water Vapor Adsorption Amount (mL/g) | $S_{micro}/S_{total}$ |
|---|---|---|---|---|---|---|---|---|---|---|
| a1 | 2021 | 2172 | 2079 | 2.30 | 1.50 | 4.20 | 2.7 | 1.2 | 2.9 | 0.96 |
| b1 | 1930 | 2020 | 1961 | 1.10 | 0.80 | 1.60 | 0.8 | 0.7 | 3.0 | 0.97 |
| c1 | 1881 | 2022 | 1966 | 0.77 | 0.60 | 0.96 | 0.4 | 0.5 | 3.2 | 0.97 |
| d1 | 1584 | 1651 | 1593 | 0.91 | 0.68 | 1.40 | 0.7 | 0.8 | 1.2 | 0.96 |
| e1 | 2373 | 2514 | 2487 | 0.78 | 0.57 | 1.10 | 0.5 | 0.7 | 3.6 | 0.99 |
| f1 | 1509 | 1842 | 1706 | 1.60 | 1.20 | 2.30 | 1.1 | 0.7 | 1.9 | 0.93 |
| g1 | 1212 | 1340 | 1266 | 1.40 | 1.00 | 1.70 | 0.7 | 0.5 | 2.3 | 0.94 |
| h1 | 1514 | 1708 | 1668 | 1.10 | 0.59 | 2.10 | 1.5 | 1.4 | 2.1 | 0.98 |
| i1 | 1080 | 1076 | 859 | 0.46 | 0.21 | 0.52 | 0.3 | 0.7 | 0.21 | 0.80 |
| j1 | 674 | 664 | 229 | 0.30 | 0.16 | 0.43 | 0.3 | 0.9 | 0.088 | 0.34 |

<Preparation of Carbon Material B and Measurement of Physical Properties>

In Examples 1A to 31A of the electrode for a metal-air battery of the present invention, 6 kinds of Carbon Materials k1 to p1 were prepared as the carbon material B. Various physical properties of various carbon materials are shown in Table 2 (the kind of carbon material and physical properties thereof). Carbon Material k1 is a carbon material wherein the three-dimensional structure was not grown and the water vapor adsorption amount was large. Carbon Material k1 is used as Comparative Example. Carbon Material l1 is a carbon material wherein the three-dimensional structure was grown but the water vapor adsorption amount was large. Carbon Material l1 is also used as Comparative Example. Carbon Material m1 a carbon material wherein the three-dimensional structure was grown to a certain extent (to the extent of satisfying the conditions of this embodiment) and the water vapor adsorption amount was small. Carbon Material n1 is a carbon material wherein the three-dimensional structure was more grown than in Carbon Material m1 and the water vapor adsorption amount was small. Carbon Material o1 is a carbon material wherein the three-dimensional structure was more grown than in Carbon Material n1 and the water vapor adsorption amount was small. Carbon Material p1 is a carbon material wherein the three-dimensional structure was most grown among Carbon Materials k1 to o1 and the water vapor adsorption amount was smallest. Carbon Material p1 is a best product out of the evaluation targets in Examples.

Here, the nitrogen adsorption specific surface area $S_{BET}$, the total surface area $S_{total}$, the micropore surface area $S_{micro}$, and the water vapor adsorption amount of Carbon Materials k1 to p1 were measured in the same way as the method for measuring data of Carbon Materials a1 to j1. The DBP absorption X ($cm^3$/100 g) was determined using an Absorptometer (manufactured by Brabender) by converting the addition amount of DBP at 70% of the maximum torque to the DBP absorption per 100 g of the sample.

300° C. for 3 hours to prepare a Pt catalyst in which 40 mass % of Pt was supported on a catalyst-supporting carbon material.

In producing the electrode for a metal-air battery of the present invention, the following coating slurries were prepared.

<Preparation Method 1 of Catalyst Layer Ink>

As starting materials, 40 mass % of the catalyst prepared above and, if desired, a carbon material having not supported thereon a catalyst element, which is selected from Table 1, and PTFE (PTFE Dispersion, D-210C, produced by Daikin Industries, Ltd.) as a binder were added to ethanol, and the mixture was ground with glass beads of 1 mm in diameter. Thereafter, the glass beads were removed, and the concentration was adjusted with ethanol to provide a platinum concentration of 0.25 mass % in the slurry, whereby a catalyst layer ink not having an agglomerate configuration was prepared.

<Preparation Method 2 of Catalyst Layer Ink>

As starting materials, 40 mass % of the catalyst prepared above and, if desired, a carbon material having not supported thereon a catalyst element, as the carbon material B, which is selected from Table 1, and PTFE (PTFE Dispersion, D-210C, produced by Daikin Industries, Ltd.) as a binder were added to ethanol, and the mixture was ground with glass beads of 1 mm in diameter. The glass beads were then removed, and the obtained slurry was vacuum-dried to obtain a carbon material A agglomerate. Subsequently, as starting materials, a carbon material B having not supported thereon a catalyst element, which is selected from Table 1, and, if desired, PTFE (PTFE Dispersion, D-210C, produced by Daikin Industries, Ltd.) as a binder were added to ethanol, and the mixture was ground with glass beads of 1 mm in diameter. The glass beads were then removed, and the obtained slurry was vacuum-dried to obtain a carbon material B agglomerate. Here, when the binder was contained in the carbon material A agglomerate or the carbon material B

TABLE 2

| Kind of Carbon Material | Specific Surface Area $S_{BET}$ ($m^2$/g) | Total Surface Area $S_{total}$ ($m^2$/g) | Micropore Surface Area $S_{micro}$ ($m^2$/g) | Water Vapor Adsorption Amount (mL/g) | DBP Absorption X (mL/100 g) | $S_{micro}/S_{total}$ | $X/S_{BET}$ |
|---|---|---|---|---|---|---|---|
| k1 | 1675 | 1704 | 1463 | 0.70 | 567 | 0.86 | 0.34 |
| l1 | 243 | 227 | 138 | 0.98 | 248 | 0.61 | 1.02 |
| m1 | 496 | 491 | 186 | 0.071 | 410 | 0.38 | 0.83 |
| n1 | 141 | 140 | 0 | 0.068 | 191 | 0.00 | 1.35 |
| o1 | 72 | 79 | 0 | 0.042 | 170 | 0.00 | 2.36 |
| p1 | 48 | 40 | 0 | 0.027 | 138 | 0.00 | 2.88 |

<Preparation of Catalyst>

Using, as the carbon material A, a carbon material having supported thereon a catalyst and, one kind of a carbon material was selected as the carbon material A from the carbon materials in Table 1, and a catalyst supporting Pt as a catalyst element was prepared by the following method. One kind of a carbon material selected from the carbon materials in Table 1 was dispersed as the carbon material A in an aqueous chloroplatinic acid solution, and the dispersion was warmed at 50° C. Hydrogen peroxide water was added thereto while stirring, and an aqueous $Na_2S_2O_4$ solution was then added to obtain a catalyst precursor. This catalyst precursor was filtered, water-washed, dried, and then subjected to reduction treatment in a 100% $H_2$ flow at agglomerate, the obtained agglomerate was heat-treated at 320° C. in an argon flow to perform fusion treatment.

Next, the obtained carbon material A agglomerate and carbon material B agglomerate were added to ethanol, and the mixture was subjected to grinding/stirring treatment with glass beads of 1 mm in diameter. The concentration was adjusted with ethanol to provide a Pt concentration of 0.25 mass % in the slurry to prepare a catalyst layer ink having an agglomerate configuration. Here, the strength of the grinding/stirring treatment was determined by adjusting it such that one or more catalyst element-free carbon material agglomerates (agglomerate Y) each having a size of 300 nm or more in terms of the equivalent-circle diameter were dispersed in the visual field having an area of 10 μm×10 μm in the cross-section of a catalyst layer formed using a catalyst layer ink previously prepared to provide the composition of Example 1A. This condition was applied to all cases.

<Formation of Electrode>

Carbon paper (GDL 24BC, produced by SGL Group) having stacked thereon a microporous layer (MPL) was used as the hydrophobic porous layer. The hydrophobic porous layer was cut into a 10 cm square (100 cm$^2$), and the catalyst layer ink having a Pt concentration of 0.25 mass % prepared above was applied wet-on-wet by spraying and vacuum-dried at 90° C. to prepare a positive electrode for air cell. Here, when the binder was used in Preparation Method 1 of Catalyst Layer Ink, the obtained electrode was heat-treated at 320° C. in an argon flow to perform fusion treatment.

In addition, the change in mass of the hydrophobic porous layer between before and after coating was measured, the Pt loading was calculated, and the coating amount was adjusted such that the platinum loading becomes 0.20 mg/cm$^2$.

<Preparation of Coin Cell for Evaluation of Metal-Air Battery Performance>

In order to evaluate the obtained electrode, a coin cell was prepared. In a coin cell case having an inner diameter of 20 mm and serving also as a negative electrode terminal, 0.30 g of a Zn powder (produced by Kojundo Chemical Laboratory Co., Ltd., particle diameter: 75 µm) was uniformly spread not to form unevenness and used as the negative electrode. Next, 140 µl of an aqueous 8 mol/l KOH solution was dropped to penetrate into the spread Zn powder, and a membrane filter (hydrophilic PTFE H100, produced by Advantec) having a diameter of 20 mm was placed thereon as a separator. The aqueous 8 mol/l KOH solution was also caused to penetrate into the separator. Furthermore, the electrode for air cell prepared above was stamped by a punch of 14 mm in diameter and overlaid on the separator with the catalyst layer-coated side down. A nickel mesh of 19 mm in diameter was further spread thereon as a positive electrode collector, and a coin cell cap as a positive electrode terminal, in which 4 air holes each having an inner diameter of 2 mm were bored and on which a gasket for preventing short circuit was mounted, was put on the current collector to obtain a coin cell for evaluation.

<Performance Evaluation>

After the preparation, the coin cell for evaluation was quickly evaluated for the performance. In the evaluation, using the case at the bottom of the prepared coin cell for evaluation as the negative electrode and the cap at the top as the positive electrode, the coin cell was nipped with a cylindrical terminal capable of controlling the pressure, and the pressure of the cylinder terminal was controlled to 75 kg/cm$^2$ so as not to block the air holes formed in the cap. A constant current of 100 mA was discharged at room temperature, and the cell voltage in 10 minutes from the start of discharge was recorded as the battery performance. Thus, in this example, a relatively high current was discharged. At this time, the cell voltage varies depending on the air diffusion resistance of the catalyst layer. In other words, as the air diffusion resistance is lower, the cell voltage tends to be larger.

<Performance Evaluation Results 1>

The compositions of the electrodes formed using the catalyst layer ink of comparative examples prepared by Preparation Method 1 of Catalyst Layer Ink and the compositions of the electrodes formed using the catalyst layer ink prepared by Preparation Method 2 of Catalyst Layer Ink are shown in Table 3 and Table 4, respectively, together with the performance evaluation results of air cells having incorporated thereinto each electrode.

In all cases shown in Tables 3 and 4, Carbon Material b1 satisfying all requirements of the present invention was used for the carbon material A having supported thereon a catalyst, and the loading of Pt as the catalyst element was consistently 0.20 mg/cm$^2$. In the case of using the carbon material B not supporting a catalyst, the kind thereof was consistently Carbon Material o1 satisfying the water vapor adsorption amount and the ratio $X/S_{BET}$ which are the requirements of the present invention, and the content in the catalyst layer was also consistently 30 mass % in total. In the case of containing a binder, the kind thereof was consistently PTFE, and the percentage content in the catalyst layer was consistently 10 wt % in total.

In all of Examples 1A to 4A shown in Table 4, a higher cell voltage and more excellent battery properties are exhibited, relative to Comparative Examples 1A to 8A shown in Tables 3 and 4. Specifically, in all of Comparative Examples 1A to 4A prepared by the method of not forming an agglomerate configuration, the cell voltage was not stabilized, and the voltage continued to drop after the start of discharge and fell below 0.6 V after 10 minutes. When Comparative Examples 5A to 8A prepared to have an agglomerate configuration are compared with Examples 1A to 4A, in Examples 1A to 4A where Carbon Material o1 not having water wettability was contained in the agglomerate X, a high cell voltage and excellent battery performance were exhibited, relative to Comparative Example 5A to 8A where Carbon Material o1 not having water wettability is not contained in the agglomerate X. Comparison among Examples 1A to 4A reveals that the performance was worst in Example 1A not containing a binder at all and most excellent in Example 3A containing a binder only in the agglomerate Y.

Next, with respect to the catalyst layers of Comparative Examples 1A to 4A shown in Table 3 and the catalyst layers of Examples 1A to 4A shown in Table 4, the cross-sectional configuration was observed. As for the observation sample, the prepared electrode was cut by a cutter knife into a size of about 10 mm square and after resin embedding with epoxy, fixed to the holder of a cryomicrotome to enable the cross-section of the catalyst layer to be cut. The prepared holder was set in the microtome, and a diamond trimming knife was set for the knife. At this time, the diamond trimming knife was angled at about 10° to the advance direction of the knife to cut the catalyst layer at a slant.

After the trimming, the sample was cut in the depth direction of the catalyst layer at a rate of 50 nm per cut at least 100 times by continuously using the diamond trimming knife to prepare a cut surface of the catalyst layer. The catalyst layer with the prepared cut surface was set on an electron microscope holder, and a secondary electron image and a reflected electron image were observed at a magnification of 10,000 times. In the catalyst layers of Comparative Examples 1A to 4A shown in Table 3, the contrast of the reflected electron image was observed to be uniformly bright, and an agglomerate of a carbon material having not supported thereon a catalyst element (gas diffusion carbon material agglomerate) was not recognized. On the other hand, in the catalyst layers of Examples 1A to 4A shown in Table 4, among the portions where the presence of a carbon material was clearly distinguished in the secondary electron image, a portion presenting a dark contrast in the reflected electron image, i.e., an agglomerate of a carbon material having not supported thereon a catalyst layer (gas diffusion carbon material agglomerate), could be observed.

For more quantitative discrimination, a reflected electron image was scanned as electronic information at a magnification of 10,000 times and a resolution of 272 DPI×272 DPI or more with brightness of 256 levels. The brightness of the scanned image was binarized using an image analysis software to display the range from dark to the 110th level by black and the range from the 111th level to bright to the 256th level by white. Thereafter, dilation processing of each black point was once performed to recognize adjacent points. Furthermore, hole-filling processing was conducted to fill blank portions in the range and allow recognition as the same range. Finally, erosion processing for returning the dilated portion to the original was performed to clarify the targeted range. After this, the equivalent-circle diameter of each black portion was calculated from the area of each black portion, and portions of less than 300 nm were all cut. The number of black portions where a carbon material was present in the secondary electron image of the same field, was counted in the remaining black portions and found to be 1 or more in all of Examples 1A to 4A.

TABLE 3

| | | Catalyst | | | | | | | |
|---|---|---|---|---|---|---|---|---|---|
| | | Catalyst element | | Carbon Material A | | Carbon Material B | | Binder | |
| Example No./ Comparative Example No. | Preparation Method of Catalyst Ink | Kind | Pt Loading (mg/cm$^2$) | Kind | Percentage Content in Catalyst Layer (mass %) | Kind | Percentage Content in Catalyst Layer (mass %) | Kind | Percentage Content in Catalyst Layer (mass %) | Power Generation Performance (V) |
| Comparative Example 1A | 1 | Pt | 0.20 | 40 | b1 | 60 | — | 0 | — | 0 | <0.6 |
| Comparative Example 2A | 1 | Pt | 0.20 | 36 | b1 | 54 | — | 0 | PTFE | 10 | <0.6 |
| Comparative Example 3A | 1 | Pt | 0.20 | 28 | b1 | 42 | o1 | 30 | — | 0 | <0.6 |
| Comparative Example 4A | 1 | Pt | 0.20 | 24 | b1 | 36 | o1 | 30 | PTFE | 10 | <0.6 |

TABLE 4

| | | Agglomerate X | | | | | |
|---|---|---|---|---|---|---|---|
| | | Catalyst | | | | Carbon Material A | Carbon Material B |
| | | Catalyst element | | | | | |
| Example No./ Comparative Example No. | Preparation Method of Catalyst Ink | Kind | Pt Loading (mg/cm$^2$) | Kind | Percentage Content in Catalyst Layer (mass %) | Kind | Percentage Content in Catalyst Layer (mass %) | Kind | Percentage Content in Catalyst Layer (mass %) |
| Comparative Example 5A | 2 | Pt | 0.20 | 28 | b1 | 42 | — | 0 |
| Comparative Example 6A | 2 | Pt | 0.20 | 24 | b1 | 36 | — | 0 |
| Comparative Example 7A | 2 | Pt | 0.20 | 24 | b1 | 36 | — | 0 |
| Comparative Example 8A | 2 | Pt | 0.20 | 24 | b1 | 36 | — | 0 |
| Example 1A | 2 | Pt | 0.02 | 28 | b1 | 42 | o1 | 10 |
| Example 2A | 2 | Pt | 0.20 | 24 | b1 | 36 | o1 | 10 |
| Example 3A | 2 | Pt | 0.20 | 24 | b1 | 36 | o1 | 10 |
| Example 4A | 2 | Pt | 0.20 | 24 | b1 | 36 | o1 | 10 |

| | Agglomerate X Binder | | Agglomerate Y | | | |
|---|---|---|---|---|---|---|
| | | | Carbon Material B | | Binder | |
| Example No./ Comparative Example No. | Kind | Percentage Content in Catalyst Layer (mass %) | Kind | Percentage Content in Catalyst Layer (mass %) | Kind | Percentage Content in Catalyst Layer (mass %) | Performance Evaluation Results (V) |
| Comparative Example 5A | — | 0 | o1 | 30 | — | 0 | <0.6 |
| Comparative Example 6A | PTFE | 10 | o1 | 30 | — | 0 | <0.6 |
| Comparative Example 7A | — | 0 | o1 | 30 | PTFE | 10 | <0.6 |

TABLE 4-continued

| | | | | | | | |
|---|---|---|---|---|---|---|---|
| Comparative Example 8A | PTFE | 5 | o1 | 30 | PTFE | 5 | <0.6 |
| Example 1A | — | 0 | o1 | 20 | — | 0 | 0.816 |
| Example 2A | PTFE | 10 | o1 | 20 | — | 0 | 0.932 |
| Example 3A | — | 0 | o1 | 20 | PTFE | 10 | 1.001 |
| Example 4A | PTFE | 5 | o1 | 20 | PTFE | 5 | 0.913 |

<Performance Evaluation Results 2>

Next, the performance was evaluated by changing the kind of the carbon material A contained in the agglomerate X. The compositions of the electrodes formed using the catalyst layer ink prepared in Preparation Method 2 of Catalyst Layer Ink and the performance evaluation results of air cells having incorporated thereinto each electrode are shown in Table 5.

In the catalyst layers shown in Table 5, the loading of Pt as the catalyst element was consistently 0.20 mg/cm², and the percentage contents of the constituent components in the catalyst layer were consistently 22 mass % of the catalyst element, 33 mass % of the carbon material A, 10 mass % of the carbon material B contained in the agglomerate X, 15 mass % of the carbon material B contained in the agglomerate Y, and 20 mass % of the binder not contained in the agglomerate X but contained only in the agglomerate Y. Carbon Material n1 satisfying the requirements of the present invention was used for the carbon material B, for both that contained in the agglomerate X and that contained in the agglomerate Y, and PTFE was used for the binder.

In Examples 5A to 9A using, as the carbon material A, Carbon Materials b1, c1, d1, e1 and g1 each satisfying all of the requirements regarding the carbon material A of the present invention, a higher cell voltage was exerted and more excellent battery performance was exhibited, relative to Comparative Examples 9A to 13A including Carbon Materials a1, f1, h1, i1 and j1 each failing in satisfying at least one or more of the requirements regarding the carbon material A of the present invention. Among others, in Example 6A using, as the carbon material A, Carbon Material c1 having a small average particle diameter and a sharp particle diameter distribution, the properties were best.

TABLE 5

| | | Agglomerate X | | | | | |
|---|---|---|---|---|---|---|---|
| | | Catalyst | | | | Carbon Material A | Carbon Material B |
| | | Catalyst element | | | | | |
| Example No./ Comparative Example No. | Preparation Method of Catalyst Ink | Kind | Pt Loading (mg/cm²) | Percentage Content in Catalyst Layer (mass %) | Kind | Percentage Content in Catalyst Layer (mass %) | Kind | Percentage Content in Catalyst Layer (mass %) |
| Comparative Example 9A | 2 | Pt | 0.20 | 22 | a1 | 33 | n1 | 10 |
| Example 5A | 2 | Pt | 0.20 | 22 | b1 | 33 | n1 | 10 |
| Example 6A | 2 | Pt | 0.20 | 22 | c1 | 33 | n1 | 10 |
| Example 7A | 2 | Pt | 0.20 | 22 | d1 | 33 | n1 | 10 |
| Example 8A | 2 | Pt | 0.20 | 22 | e1 | 33 | n1 | 10 |
| Comparative Example 10A | 2 | Pt | 0.20 | 22 | f1 | 33 | n1 | 10 |
| Example 9A | 2 | Pt | 0.20 | 22 | g1 | 33 | n1 | 10 |
| Comparative Example 11A | 2 | Pt | 0.20 | 22 | h1 | 33 | n1 | 10 |
| Comparative Example 12A | 2 | Pt | 0.20 | 22 | i1 | 33 | n1 | 10 |
| Comparative Example 13A | 2 | Pt | 0.20 | 22 | j1 | 33 | n1 | 10 |

| | Agglomerate X Binder | | Agglomerate Y | | | | Performance Evaluation Results (V) |
|---|---|---|---|---|---|---|---|
| | | | Carbon Material B | | Binder | | |
| Example No./ Comparative Example No. | Kind | Percentage Content in Catalyst Layer (mass %) | Kind | Percentage Content in Catalyst Layer (mass %) | Kind | Percentage Content in Catalyst Layer (mass %) | |
| Comparative Example 9A | — | 0 | n1 | 15 | PTFE | 20 | <0.6 |
| Example 5A | — | 0 | n1 | 15 | PTFE | 20 | 0.919 |
| Example 6A | — | 0 | n1 | 15 | PTFE | 20 | 1.085 |
| Example 7A | — | 0 | n1 | 15 | PTFE | 20 | 1.046 |
| Example 8A | — | 0 | n1 | 15 | PTFE | 20 | 1.002 |

TABLE 5-continued

| | | | | | | | |
|---|---|---|---|---|---|---|---|
| Comparative Example 10A | — | 0 | n1 | 15 | PTFE | 20 | <0.6 |
| Example 9A | — | 0 | n1 | 15 | PTFE | 20 | 0.860 |
| Comparative Example 11A | — | 0 | n1 | 15 | PTFE | 20 | 0.682 |
| Comparative Example 12A | — | 0 | n1 | 15 | PTFE | 20 | <0.6 |
| Comparative Example 13A | — | 0 | n1 | 15 | PTFE | 20 | <0.6 |

<Performance Evaluation Results 3>

Next, the performance was evaluated by changing the kind of the carbon material B contained in the agglomerate X and the percentage content in the catalyst layer. The compositions of the electrodes formed using the catalyst layer ink prepared in Preparation Method 2 of Catalyst Layer Ink and the performance evaluation results of air cells having incorporated thereinto each of the electrodes are shown in Table 6.

In the catalyst layers shown in Table 6, the loading of Pt as the catalyst element was consistently 0.20 mg/cm$^2$, the percentage content of the carbon material B in the catalyst layer was consistently 10 mass % as the portion contained in the agglomerate Y, and the binder was not contained in the agglomerate X but contained only in the agglomerate Y consistently in an amount of 10 mass %. Carbon Material d1 satisfying the requirements of the present invention was used for the carbon material A, Carbon Material o1 satisfying the requirements of the present invention was used for the carbon material B contained in the agglomerate Y, and PTFE was used for the binder.

In Examples 10A to 18A wherein the carbon materials B contained in the agglomerate X were Carbon Materials m1, n1, o1 and p1 satisfying both conditions that the water vapor adsorption amount in an environment of 25° C. and a relative pressure of 0.1 is less than 0.1 cm$^3$/g and that the ratio X/S$_{BET}$ of the DBP absorption X (cm$^3$/100 g) to the specific surface area S$_{BET}$ by BET evaluation is 0.5 or more, which are the requirements regarding the carbon material B of the present invention, a higher cell voltage was exerted and more excellent battery performance was exhibited, relative to Comparative Examples 14A and 15A wherein the carbon materials B contained in the agglomerate X were Carbon Materials k1 and l1 each failing in satisfying the requirements regarding the carbon material B of the present invention.

Specifically, in Examples 15A and 18A wherein the carbon materials B were Carbon Materials o1 and p1 having a water vapor adsorption amount of less than 0.05 cm$^3$/L (with respect to Carbon Material o1, take note of Example 15A in which the content in the catalyst layer was the same as in other Examples), the battery properties were particularly good. In Table 6, when comparing Comparative Examples 16A and 17A with Examples 12A to 17A, where the percentage contents of the carbon material B contained in the agglomerate X in the catalyst layer were changed in the range of 0 to 40 mass %, in Comparative Example 16A not containing the carbon material B in the agglomerate X or in Comparative Example 17A containing 40 mass % of the carbon material B in the agglomerate X, containing 10 mass % of the carbon material B also in the agglomerate Y, and having a total percentage content of the carbon material B in the catalyst layer of 50 mass %, the performance was inferior to that in Examples 12A to 17A containing the carbon material B in both the agglomerate X and the agglomerate Y and having a total percentage content in the catalyst layer of from more than 10 mass % to less than 50 mass %. In addition, the properties were particularly good when the total percentage content in the catalyst layer was between more than 10 mass % and 40 mass % or less. In Example 16A having a total percentage content of the carbon material B in the catalyst layer of 30 mass %, the properties were the best among Examples 12A to 17A. In addition, in Examples 13A to 17A where the percentage content of the carbon material B in the agglomerate X was from 0.1 to 0.5, the properties were particularly good.

TABLE 6

| | | | | | | | | |
|---|---|---|---|---|---|---|---|---|
| | | Agglomerate X | | | | | | |
| | | Catalyst | | | | | | |
| | | Catalyst element | | | Carbon Material A | | Carbon Material B | |
| Example No./ Comparative Example No. | Preparation Method of Catalyst Ink | Kind | Pt Loading (mg/cm$^2$) | Percentage Content in Catalyst Layer (mass %) | Kind | Percentage Content in Catalyst Layer (mass %) | Kind | Percentage Content in Catalyst Layer (mass %) |
| Comparative Example 14A | 2 | Pt | 0.20 | 26 | d1 | 39 | k1 | 15 |
| Comparative Example 15A | 2 | Pt | 0.20 | 26 | d1 | 39 | l1 | 15 |
| Example 10A | 2 | Pt | 0.20 | 26 | d1 | 39 | m1 | 15 |
| Example 11A | 2 | Pt | 0.20 | 26 | d1 | 39 | n1 | 15 |
| Comparative Example 16A | 2 | Pt | 0.20 | 32 | d1 | 48 | o1 | 0 |
| Example 12A | 2 | Pt | 0.20 | 30.8 | d1 | 46.2 | o1 | 3 |
| Example 13A | 2 | Pt | 0.20 | 30 | d1 | 45 | o1 | 5 |
| Example 14A | 2 | Pt | 0.20 | 28 | d1 | 42 | o1 | 10 |

TABLE 6-continued

| Example No./Comparative Example No. | | | | | | | | | Agglomerate X Binder | | Agglomerate Y | | | | |
|---|---|---|---|---|---|---|---|---|---|---|---|---|---|---|---|
| | | | | | | | | | | | Carbon Material B | | Binder | | |
| | | | | | | | | | Kind | Percentage Content in Catalyst Layer (mass %) | Kind | Percentage Content in Catalyst Layer (mass %) | Kind | Percentage Content in Catalyst Layer (mass %) | Performance Evaluation Results (V) |
| Example 15A | 2 | Pt | 0.20 | 26 | d1 | 39 | o1 | 15 | | | | | | | |
| Example 16A | 2 | Pt | 0.20 | 24 | d1 | 36 | o1 | 20 | | | | | | | |
| Example 17A | 2 | Pt | 0.20 | 20 | d1 | 30 | o1 | 30 | | | | | | | |
| Comparative Example 17A | 2 | Pt | 0.20 | 16 | d1 | 24 | o1 | 40 | | | | | | | |
| Example 18A | 2 | Pt | 0.20 | 26 | d1 | 39 | p1 | 15 | | | | | | | |
| Comparative Example 14A | | | | | | | | | — | 0 | o1 | 10 | PTFE | 10 | <0.6 |
| Comparative Example 15A | | | | | | | | | — | 0 | o1 | 10 | PTFE | 10 | <0.6 |
| Example 10A | | | | | | | | | — | 0 | o1 | 10 | PTFE | 10 | 0.961 |
| Example 11A | | | | | | | | | — | 0 | o1 | 10 | PTFE | 10 | 0.974 |
| Comparative Example 16A | | | | | | | | | — | 0 | o1 | 10 | PTFE | 10 | <0.6 |
| Example 12A | | | | | | | | | — | 0 | o1 | 10 | PTFE | 10 | 0.708 |
| Example 13A | | | | | | | | | — | 0 | o1 | 10 | PTFE | 10 | 0.786 |
| Example 14A | | | | | | | | | — | 0 | o1 | 10 | PTFE | 10 | 0.917 |
| Example 15A | | | | | | | | | — | 0 | o1 | 10 | PTFE | 10 | 0.982 |
| Example 16A | | | | | | | | | — | 0 | o1 | 10 | PTFE | 10 | 1.002 |
| Example 17A | | | | | | | | | — | 0 | o1 | 10 | PTFE | 10 | 0.918 |
| Comparative Example 17A | | | | | | | | | — | 0 | o1 | 10 | PTFE | 10 | <0.6 |
| Example 18A | | | | | | | | | — | 0 | o1 | 10 | PTFE | 10 | 1.022 |

<Performance Evaluation Results 4>

Next, the performance was evaluated by changing the kind of the carbon material B contained in the agglomerate Y and the percentage content in the catalyst layer. The compositions of the electrodes formed using the catalyst layer ink prepared in Preparation Method 2 of Catalyst Layer Ink and the performance evaluation results of air cells having incorporated thereinto each of the electrodes are shown in Table 7.

In the catalyst layers shown in Table 7, the loading of Pt as the catalyst element was consistently 0.20 mg/cm$^2$, the percentage content of the carbon material B in the catalyst layer was 10 mass % as the portion contained in the agglomerate X, and the percentage content of the binder in the catalyst layer, the binder being not contained in the agglomerate X but contained only in the agglomerate Y, was consistently 10 mass %. Carbon Material c1 satisfying the requirements of the present invention was used for the carbon material A, Carbon Material p1 satisfying the requirements of the present invention was used for the carbon material B contained in the agglomerate X, and PTFE was used for the binder.

In Examples 21A to 29A wherein the carbon material B contained in the agglomerate Y were Carbon Materials m1, n1, o1 and p1 satisfying both condition wherein the water vapor adsorption amount in an environment of 25° C. and a relative pressure of 0.1 is less than 0.1 cm$^3$/g and condition wherein the ratio X/S$_{BET}$ of the DBP absorption X (cm$^3$/100 g) to the specific surface area S$_{BET}$ by BET evaluation is 0.5 or more, which are the requirements regarding the carbon material B of the present invention, a higher cell voltage was exerted and more excellent battery performance was exhibited, relative to Comparative Examples 18A and 19A wherein the carbon materials B contained in the agglomerate Y were Carbon Materials k1 and l1 failing in satisfying the requirements regarding the carbon material B of the present invention.

In Table 7, when comparing Comparative Examples 20A and 21A with Examples 24A to 29A, where the percentage contents of the carbon material B contained in the agglomerate Y in the catalyst layer were changed in the range of 0 to 45 mass %, in Comparative Example 20A not containing the carbon material B in the agglomerate Y or in Comparative Example 21A containing 10 mass % of the carbon material B in the agglomerate X, containing 45 mass % of the carbon material B also in the agglomerate Y, and having a total percentage content of the carbon material B in the catalyst layer of 50 mass % or more, the performance was inferior to Examples 24A to 29A containing the carbon material B in both the agglomerate X and the agglomerate Y and having a total percentage content in the catalyst layer of from more than 10 mass % to less than 50 mass %. In Example 28A having a total percentage content of the carbon material B in the catalyst layer of 35 mass %, the properties were best among Examples 24A to 29A.

Among catalyst layers shown in Table 7, with respect to the catalyst layers of Examples 25A and 27A, the cross-sectional configuration was observed in the same manner as in <Performance Evaluation Results 1>. When counting the number of black portions where a carbon material was present in the secondary electron image of the same field among black portions of 300 nm or more, the number, it was confirmed that the number of the black portions was 1 or more. Furthermore, black portions having an equivalent-circle diameter of less than 500 nm were eliminated, as a result, in Example 25A, the remaining black portions included no black portion where a carbon material was present in the secondary electron image of the same field.

However, in the case of Example 27A excellent particularly in the power generation performance, when counting the number of black portions where a carbon material was present in the secondary electron image of the same field in the remaining black portions, it was confirmed that the number of the black portions was 1 or more. Accordingly, it could be confirmed that the catalyst layer of Example 27A has the particularly preferable configuration of the present invention. Here, the reason why Example 27A has the above-described configuration includes the fact that the percentage content of the carbon material B in the agglomerate Y is higher in Example 27A than in Example 25A.

wherein the percentage content α of the carbon material B on the negative electrode (zinc electrode)-facing side is from 0 mass % to less than 20 mass %, the percentage content β of the carbon material B on the porous diffusion layer side is from more than 10 mass % to less than 50 mass %, and α<β is satisfied. The catalyst layer of Example 30A had a two-layer configuration, and the catalyst layer of Example 31A had a five-layer configuration.

The preparation method of the catalyst layer of Example 30A is described below. The hydrophobic porous layer was cut into a 10 cm square (100 cm²). First, a catalyst layer ink having a Pt concentration of 0.25 mass % was prepared to

TABLE 7

| Example No./ Comparative Example No. | Preparation Method of Catalyst Ink | Agglomerate X – Catalyst – Catalyst element Kind | Pt Loading (mg/cm²) | Percentage Content in Catalyst Layer (mass %) | Carbon Material A Kind | Percentage Content in Catalyst Layer (mass %) | Carbon Material B Kind | Percentage Content in Catalyst Layer (mass %) |
|---|---|---|---|---|---|---|---|---|
| Comparative Example 18A | 2 | Pt | 0.20 | 22 | c1 | 33 | p1 | 10 |
| Comparative Example 19A | 2 | Pt | 0.20 | 22 | c1 | 33 | p1 | 10 |
| Example 21A | 2 | Pt | 0.20 | 22 | c1 | 33 | p1 | 10 |
| Example 22A | 2 | Pt | 0.20 | 22 | c1 | 33 | p1 | 10 |
| Example 23A | 2 | Pt | 0.20 | 26 | c1 | 39 | p1 | 10 |
| Comparative Example 20A | 2 | Pt | 0.20 | 32 | c1 | 48 | p1 | 10 |
| Example 24A | 2 | Pt | 0.20 | 30.8 | c1 | 46.2 | p1 | 10 |
| Example 25A | 2 | Pt | 0.20 | 30 | c1 | 45 | p1 | 10 |
| Example 26A | 2 | Pt | 0.20 | 28 | c1 | 42 | p1 | 10 |
| Example 27A | 2 | Pt | 0.20 | 26 | c1 | 39 | p1 | 10 |
| Example 28A | 2 | Pt | 0.20 | 22 | c1 | 33 | p1 | 10 |
| Example 29A | 2 | Pt | 0.20 | 18 | c1 | 27 | p1 | 10 |
| Comparative Example 21A | 2 | Pt | 0.20 | 14 | c1 | 21 | p1 | 10 |

| Example No./ Comparative Example No. | Agglomerate X Binder Kind | Percentage Content in Catalyst Layer (mass %) | Agglomerate Y – Carbon Material B Kind | Percentage Content in Catalyst Layer (mass %) | Binder Kind | Percentage Content in Catalyst Layer (mass %) | Performance Evaluation Results (V) |
|---|---|---|---|---|---|---|---|
| Comparative Example 18A | — | 0 | k1 | 25 | PTFE | 10 | <0.6 |
| Comparative Example 19A | — | 0 | l1 | 25 | PTFE | 10 | <0.6 |
| Example 21A | — | 0 | m1 | 25 | PTFE | 10 | 1.068 |
| Example 22A | — | 0 | n1 | 25 | PTFE | 10 | 1.097 |
| Example 23A | — | 0 | o1 | 25 | PTFE | 10 | 1.140 |
| Comparative Example 20A | — | 0 | p1 | 0 | PTFE | 10 | <0.6 |
| Example 24A | — | 0 | p1 | 3 | PTFE | 10 | 0.716 |
| Example 25A | — | 0 | p1 | 5 | PTFE | 10 | 0.836 |
| Example 26A | — | 0 | p1 | 10 | PTFE | 10 | 1.019 |
| Example 27A | — | 0 | p1 | 15 | PTFE | 10 | 1.133 |
| Example 28A | — | 0 | p1 | 25 | PTFE | 10 | 1.149 |
| Example 29A | — | 0 | p1 | 35 | PTFE | 10 | 0.969 |
| Comparative Example 21A | — | 0 | p1 | 45 | PTFE | 10 | <0.6 |

<Performance Evaluation Results 5>

The catalyst layers of Examples 30A and 31A shown in Table 8-1 were formed to have a catalyst layer configuration provide the composition shown in the lower row of Example 30A of Table 8-1, this catalyst layer ink was applied by spraying and vacuum-dried at 90° C., and the coating amount was adjusted such that the Pt loading calculated from the change in mass of the hydrophobic porous layer between before and after coating becomes 0.10 mg/cm$^2$. Subsequently, a catalyst layer ink having a Pt concentration of 0.25 mass % was prepared to provide the composition shown in the upper row of Example 30A of Table 8-1, this catalyst layer ink was applied by spraying and vacuum-dried at 90° C., and the coating amount was adjusted such that the Pt loading calculated from the change in mass of the hydrophobic porous layer between before and after coating becomes 0.10 mg/cm$^2$. As a result, the catalyst layer of Example 30A having a platinum loading of 0.20 mg/cm$^2$, wherein two layers of a catalyst layer having a percentage content of the carbon material B of 30 mass % and a catalyst layer having a percentage content of the carbon material B of 10 mass % were stacked, was obtained on MPL of the hydrophobic porous layer.

between before and after coating were repeated in order from the catalyst layer ink having the composition of the lowest row shown in Example 31A of Table 8-1, and each of the catalyst layer inks was applied wet-on-wet while adjusting the coating amount such that the Pt loading becomes 0.04 mg/cm$^2$. As a result, the catalyst layer of Example 31A having a platinum loading of 0.20 mg/cm$^2$, in which the percentage content of the carbon material B was stepwise changed from 40 mass % to 0 mass % starting from the hydrophobic porous layer side, was obtained on MPL of the hydrophobic porous layer.

As for the performance test results of these catalyst layers of Examples 30A and 31A, results surpassing all of Comparative Examples and Examples shown in Tables 3 to 7 were obtained. The results are shown in Table 8-2.

TABLE 8-1

| Example No./ Comparative Example No. | Preparation Method of Catalyst Ink | Agglomerate X Catalyst | | | | Carbon Material A | |
|---|---|---|---|---|---|---|---|
| | | Catalyst element | | | | | |
| | | | Supported Rate of Catalyst (mass %) | Pt Loading | | Percentage Content in Catalyst Layer (mass %) | Percentage Content in Catalyst Layer (mass %) |
| | | Kind | | Each Layer (mg/cm$^2$) | Total (mg/cm$^2$) | | Kind |
| Example 30A | 2 | Pt | 40.0 | 0.10 | 0.20 | 32 | c1 | 48 |
| | 2 | Pt | 40.0 | 0.10 | | 24 | c1 | 36 |
| Example 31A | 2 | Pt | 25.0 | 0.04 | 0.20 | 25 | c1 | 75 |
| | 2 | Pt | 30.0 | 0.04 | | 25 | c1 | 58 |
| | 2 | Pt | 30.0 | 0.04 | | 25 | c1 | 58 |
| | 2 | Pt | 40.0 | 0.04 | | 25 | c1 | 38 |
| | 2 | Pt | 50.0 | 0.04 | | 25 | c1 | 25 |

| Example No./ Comparative Example No. | Agglomerate X | | | | Agglomerate Y | | | |
|---|---|---|---|---|---|---|---|---|
| | Carbon Material B | | Binder | | Carbon Material B | | Binder | |
| | Kind | Percentage Content in Catalyst Layer (mass %) | Kind | Percentage Content in Catalyst Layer (mass %) | Kind | Percentage Content in Catalyst Layer (mass %) | Kind | Percentage Content in Catalyst Layer (mass %) |
| Example 30A | p1 | 5 | — | 0 | p1 | 5 | PTFE | 10 |
| | p1 | 10 | — | 0 | p1 | 20 | PTFE | 10 |
| Example 31A | p1 | 0 | — | 0 | — | 0.0 | — | 0 |
| | p1 | 5 | — | 0 | p1 | 9.7 | PTFE | 2 |
| | p1 | 5 | — | 0 | p1 | 7.7 | PTFE | 4 |
| | p1 | 8 | — | 0 | p1 | 23.5 | PTFE | 6 |
| | p1 | 10 | — | 0 | p1 | 30.0 | PTFE | 10 |

In producing the catalyst layer of Example 31A shown in Table 8-1, in addition to the Pt catalyst of 40 mass % prepared above, Pt catalysts having a supported rate of 25 mass %, 30 mass %, 40 mass % and 50 mass % were newly prepared using Carbon Material c1 as the carbon material A of the catalyst support according to the method described in <Preparation of Catalyst>. Using these four kinds of the Pt catalysts with a supported rate of 25 mass %, 30 mass %, 40 mass % and 50 mass %, five kinds of catalyst layer inks were prepared to provide five kinds of compositions (the catalyst of 30 mass % was used in two kinds of compositions) shown in Example 31A of Table 8-1. With respect to these five kinds of the catalyst layer inks, spray coating, vacuum drying at 90° C., and measurement of the change in weight

TABLE 8-2

| Example No./ Comparative Example No. | Performance Evaluation Results (V) |
|---|---|
| Example 30A | 1.154 |
| Example 31A | 1.158 |

Examples 1B to 36B and Comparative Examples 1B to 30B

<Measurement of Physical Properties of Carbon Material>
In Examples 1B to 36B of the electrode for a metal-air battery of the present invention, twelve kinds of Carbon Materials a2 to 12 were prepared as the carbon material. Various physical properties of various carbon materials are shown in Table 9 (the kind of carbon material and physical properties thereof).

Here, the nitrogen adsorption specific surface area $S_{BET}$, the total surface area $S_{total}$, the micropore surface area $S_{micro}$, and the water vapor adsorption amount of each of Carbon Materials a2 to 12 shown in Table 9 were measured by the same methods as the measurement method used for Carbon Materials a1 to j1 above. The DBP absorption in Table 9 was determined using an Absorptometer (manufactured by Brabender) by converting the addition amount of DBP at 70% of the maximum torque to the DBP absorption per 100 g of the sample.

TABLE 9

| Kind of Carbon Material | Specific Surface Area $S_{BET}$ (m²/g) | Total Surface Area $S_{total}$ (m²/g) | Micropore Surface Area $S_{micro}$ (m²/g) | Water Vapor Adsorption Amount (mL/g) | DBP Absorption X (mL/100 g) | $S_{micro}/S_{total}$ | $X/S_{BET}$ |
|---|---|---|---|---|---|---|---|
| a2 | 1930 | 2020 | 1961 | 3.0 | <50 | 0.97 | <0.03 |
| b2 | 1754 | 1723 | 1160 | 0.43 | 678 | 0.67 | 0.39 |
| c2 | 1364 | 1348 | 850 | 0.27 | 588 | 0.63 | 0.43 |
| d2 | 1042 | 1043 | 542 | 0.16 | 527 | 0.52 | 0.51 |
| e2 | 674 | 664 | 229 | 0.088 | 449 | 0.34 | 0.67 |
| f2 | 241 | 227 | 138 | 0.98 | 248 | 0.61 | 1.03 |
| g2 | 1335 | 1331 | 1132 | 0.61 | 512 | 0.85 | 0.38 |
| h2 | 1080 | 1076 | 859 | 0.23 | 491 | 0.80 | 0.45 |
| i2 | 634 | 711 | 489 | 0.093 | 334 | 0.69 | 0.53 |
| j2 | 141 | 140 | 0 | 0.068 | 191 | 0.00 | 1.35 |
| k2 | 72 | 79 | 0 | 0.042 | 170 | 0.00 | 2.36 |
| l2 | 48 | 40 | 0 | 0.027 | 138 | 0.00 | 2.88 |

<Preparation of Catalyst>

Using, as the carbon material A, a carbon material having supported thereon a catalyst, a catalyst supporting Pt as a catalyst element was prepared by the same method as the preparation method of catalyst in Examples 1A to 31A and Comparative Examples 1A to 21A except that one kind of a carbon material was selected as the carbon material A from the carbon materials in Table 9.

<Preparation Methods 1 and 2 of Catalyst Layer Ink>

In producing the electrode for a metal-air battery of the present invention, coating slurries were prepared by the same method as the preparation method of coating slurry in Examples 1A to 31A and Comparative Examples 1A to 21A. More specifically, catalyst layer inks were prepared by the same method as "Preparation Method 1 (or 2) of Catalyst Layer Ink" that is the preparation method of catalyst layer inks of Examples 1A to 31A and Comparative Examples 1A to 21A, except for using, as starting materials, 40 mass % of the catalyst prepared above and a carbon material having not supported thereon a catalyst element, which is selected from Table 9.

Here, in Preparation Method 2 of Catalyst Layer Ink, the strength of the grinding/stirring treatment was determined by adjusting the strength such that one or more catalyst element-free carbon material agglomerates (agglomerate Y) having a size of 300 nm or more in terms of the equivalent-circle diameter were dispersed in the visual field having an area of 10 μm×10 μm in the cross-section of a catalyst layer formed using a catalyst layer ink previously prepared to provide the composition of Example 1B, and this condition was applied to all cases.

<Formation of Electrode>

A positive electrode for air cell was prepared by the same method as the preparation method of a positive electrode for air cell in the above-mentioned Examples 1A to 31A and Comparative Examples 1A to 21A except for using the catalyst layer ink having a Pt concentration of 0.25 mass % prepared above. In addition, the change in mass of the hydrophobic porous layer between before and after coating was measured, the Pt loading was calculated, and the coating amount was adjusted such that the platinum loading becomes 0.20 mg/cm².

<Preparation of Coin Cell for Evaluation of Metal-Air Battery Performance>

In order to evaluate the obtained electrode, coin cells for evaluation of metal-air battery performance of Examples 1B to 36B and Comparative Examples 1B to 30B were prepared in the same method as the preparation method of a coin cell for evaluation of metal-air battery performance of the above-mentioned Examples 1A to 31A and Comparative Examples 1A to 21A above.

<Performance Evaluation>

After the preparing the coin cells, the coin cells for evaluation were quickly evaluated for the performance. In the evaluation, using the underside case of the prepared coin cell for evaluation as the negative electrode and the topside cap as the positive electrode, the coin cell was nipped with a cylindrical terminal capable of controlling the pressure, and the pressure of the cylinder terminal was controlled to 75 kg/cm² so as not to block the air holes formed in the cap. A constant current of 5 mA was discharged at room temperature, and the cell voltage in 10 minutes from the start of discharge was recorded as the battery performance.

<Performance Evaluation Results 1>

The compositions of the electrodes formed using the catalyst layer ink prepared in Preparation Method 1 of Catalyst Layer Ink as Comparative Examples and the compositions of the electrode formed using the catalyst layer ink prepared in Preparation Method 2 of Catalyst Layer Ink are shown in Table 10 and Table 11, respectively, together with the performance evaluation results of air cells having incorporated thereinto each electrode.

In all cases shown in Tables 10 and 11, Carbon Material b2 satisfying the water vapor adsorption amount and the ratio $S_{micro}/S_{total}$ which are requirements of the present invention, was used for the carbon material A having supported thereon a catalyst, and the loading of Pt as the catalyst element was consistently 0.20 mg/cm². In the case of using the carbon material B not supporting a catalyst, the kind thereof was consistently Carbon Material k2 satisfying the water vapor adsorption amount and the ratio $X/S_{BET}$ which are the requirements of the present invention, and the content in the catalyst layer was consistently 30 mass % in total. In the case of containing a binder, the kind thereof was consistently PTFE, and the percentage content in the catalyst layer was consistently 10 wt % in total.

In all of Examples 1B to 4B shown in Table 11, a higher cell voltage and more excellent battery properties are exhibited, relative to Comparative Examples 1B to 8B shown in Tables 10 and 11. Specifically, in all of Comparative Examples 1B to 4B prepared by the method of not forming an agglomerate configuration, the cell voltage was not stabilized, and the voltage continued to drop from the start of discharge and fell below 0.8 V in 10 minutes. When Comparative Examples 5B to 8B prepared to have an agglomerate configuration are compared with Examples 1B to 4B, in Examples 1B to 4B where Carbon Material k2 not having water wettability was contained in the agglomerate X, a high cell voltage and excellent battery performance were exhibited, relative to Comparative Example 5B to 8B where Carbon Material k2 not having water wettability is not contained in the agglomerate X. Comparison among Examples 1B to 4B reveals that the performance was worst in Example 1B not containing a binder at all and the performance was most excellent in Example 3B containing a binder only in the agglomerate Y.

Next, with respect to the catalyst layers of Comparative Examples 1B to 4B shown in Table 10 and the catalyst layers of Examples 1B to 4B shown in Table 11, the cross-sectional configuration was observed. As for the observation sample, the prepared electrode was cut by a cutter knife into a size of about 10 mm square and after resin embedding with epoxy, fixed to the holder of a cryomicrotome to enable the cross-section of the catalyst layer to be cut. The prepared holder was set in the microtome, and a diamond trimming knife was set for the knife. At this time, the diamond trimming knife was angled at about 10° to the advance direction of the knife to be cut the catalyst layer at a slant.

After the trimming, the sample was cut in the depth direction of the catalyst layer at a rate of 50 nm per cut at least 100 times by continuously using the diamond trimming knife to prepare a cut surface of the catalyst layer. The catalyst layer with the thus-prepared cut surface was set on an electron microscope holder, and a secondary electron image and a reflected electron image were observed at a magnification of 10,000 times. In the catalyst layers of Comparative Examples 1B to 4B shown in Table 10, the contrast of the reflected electron image was observed to be uniformly bright, and an agglomerate of a carbon material having not supported thereon a catalyst element (gas diffusion carbon material agglomerate) was not recognized. On the other hand, in the catalyst layers of Examples 1B to 4B shown in Table 11, among the portions where the presence of a carbon material was clearly distinguished in the secondary electron image, a portion presenting a dark contrast in the reflected electron image, i.e., an agglomerate of a carbon material having not supported thereon a catalyst layer (gas diffusion carbon material agglomerate), could be observed.

For more quantitative discrimination, a reflected electron image was scanned as electronic information at a magnification of 10,000 times and a resolution of 272 DPI×272 DPI or more with brightness of 256 levels. The brightness of the scanned image was binarized using an image analysis software to display the range from dark to the 110th level by black and the range from the 111th level to bright to the 256th level by white. Thereafter, dilation processing of each black point was once performed to recognize adjacent points. Furthermore, hole-filling processing was conducted to fill blank portions in the range and allow recognition as the same range. Finally, erosion processing for returning the dilated portion to the original was performed to clarify the targeted range. After this, the equivalent-circle diameter of each black portion was calculated from the area of each black portion, and portions of less than 300 nm were all cut. The number of black portions where a carbon material was present in the secondary electron image of the same field, was counted in the remaining black portions and it was found that the number of the black portions was 1 or more in all of Examples 1B to 4B.

TABLE 10

| Example No./ Comparative Example No. | Preparation Method of Catalyst Ink | Catalyst element Kind | Pt Loading (mg/cm$^2$) | Percentage Content in Catalyst Layer (mass %) | Carbon Material A Kind | Percentage Content in Catalyst Layer (mass %) | Carbon Material B Kind | Percentage Content in Catalyst Layer (mass %) | Binder Kind | Percentage Content in Catalyst Layer (mass %) | Performance Evaluation Results (V) |
|---|---|---|---|---|---|---|---|---|---|---|---|
| Comparative Example 1B | 1 | Pt | 0.20 | 40 | b2 | 60 | — | 0 | — | 0 | <0.8 |
| Comparative Example 2B | 1 | Pt | 0.20 | 32 | b2 | 48 | — | 0 | PTFE | 20 | <0.8 |
| Comparative Example 3B | 1 | Pt | 0.20 | 32 | b2 | 48 | k2 | 20 | — | 0 | <0.8 |
| Comparative Example 4B | 1 | Pt | 0.20 | 24 | b2 | 36 | k2 | 20 | PTFE | 20 | <0.8 |

TABLE 11

| Example No./ Comparative Example No. | Preparation Method of Catalyst Ink | Catalyst element Kind | Pt Loading (mg/cm²) | Percentage Content in Catalyst Layer (mass %) | Carbon Material A Kind | Percentage Content in Catalyst Layer (mass %) | Carbon Material B Kind | Percentage Content in Catalyst Layer (mass %) |
|---|---|---|---|---|---|---|---|---|
| Comparative Example 5B | 2 | Pt | 0.20 | 28 | b2 | 42 | — | 0 |
| Comparative Example 6B | 2 | Pt | 0.20 | 24 | b2 | 36 | — | 0 |
| Comparative Example 7B | 2 | Pt | 0.20 | 24 | b2 | 36 | — | 0 |
| Comparative Example 8B | 2 | Pt | 0.20 | 24 | b2 | 36 | — | 0 |
| Example 1B | 2 | Pt | 0.20 | 28 | b2 | 42 | k2 | 10 |
| Example 2B | 2 | Pt | 0.20 | 24 | b2 | 36 | k2 | 10 |
| Example 3B | 2 | Pt | 0.20 | 24 | b2 | 36 | k2 | 10 |
| Example 4B | 2 | Pt | 0.20 | 24 | b2 | 36 | k2 | 10 |

| Example No./ Comparative Example No. | Agglomerate X Binder Kind | Percentage Content in Catalyst Layer (mass %) | Carbon Material B Kind | Percentage Content in Catalyst Layer (mass %) | Agglomerate Y Binder Kind | Percentage Content in Catalyst Layer (mass %) | Performance Evaluation Results (V) |
|---|---|---|---|---|---|---|---|
| Comparative Example 5B | — | 0 | k2 | 30 | — | 0 | 0.829 |
| Comparative Example 6B | PTFE | 10 | k2 | 30 | — | 0 | 0.932 |
| Comparative Example 7B | — | 0 | k2 | 30 | PTFE | 10 | 0.87 |
| Comparative Example 8B | PTFE | 5 | k2 | 30 | PTFE | 5 | 0.944 |
| Example 1B | — | 0 | k2 | 20 | — | 0 | 1.265 |
| Example 2B | PTFE | 10 | k2 | 20 | — | 0 | 1.306 |
| Example 3B | — | 0 | k2 | 20 | PTFE | 10 | |
| Example 4B | PTFE | 5 | k2 | 20 | PTFE | 5 | 1.285 |

<Performance Evaluation Results 2>

Next, the performance was evaluated by changing the kind of the carbon material A contained in the agglomerate X. The compositions of the electrodes formed using the catalyst layer ink prepared in Preparation Method 2 of Catalyst Layer Ink and the performance evaluation results of air cells having incorporated thereinto each electrode are shown in Table 12.

In the catalyst layers shown in Table 12, the loading of Pt as the catalyst element was consistently 0.20 mg/cm², and the percentage contents of the constituent components in the catalyst layer were consistently 22 mass % of the catalyst element, 33 mass % of the carbon material A, 10 mass % of the carbon material B contained in the agglomerate X, 15 mass % of that contained in the agglomerate Y, and 20 mass % of the binder not contained in the agglomerate X but contained only in the agglomerate Y. Carbon Material j2 satisfying the requirements of the present invention was used for the carbon material B, for both that contained in the agglomerate X and that contained in the agglomerate Y, and PTFE was used for the binder.

Examples 5B to 10B include, as the carbon material A, Carbon Materials b2, c2, d2, f2, g2 and h2 each satisfying both conditions wherein the water vapor adsorption amount at 25° C. and a relative pressure of 0.1 is 0.1 cm³/g or more and wherein the ratio $S_{micro}/S_{total}$ of the micropore surface area $S_{micro}$ as determined by t-plot analysis of a nitrogen adsorption isotherm to the total surface area $S_{total}$ is 0.90 or less. The above-mentioned conditions are the requirements regarding the carbon material A of the present invention. In Examples 5B to 10B, a higher cell voltage and more excellent battery performance were exhibited, relative to Comparative Examples 9B to 14B including Carbon Materials a2, e2, i2, j2, k2 and l2 each failing in satisfying the requirements regarding the carbon material A of the present invention. Particularly, in Comparative Example 9B having a similar configuration to that of Example 9B of Patent Document 5, wherein Carbon Material a2 dominated by the micropore surface area and having an extremely high water vapor adsorption amount was used as the carbon material A and Carbon Material j2 having low water wettability was contained in the agglomerate X, the performance was relatively high among Comparative Examples but was low compared with Examples of this invention. Among Examples, Examples 5B, 6B and 8B to 10B include, as the carbon material A, Carbon Materials b2, c2, f2, g2 and h2 each having a water vapor adsorption amount of 0.2 cm$^3$/g or more at 25° C. and a relative pressure of 0.1. In the Examples 5B, 6B and 8B to 10B, the performance was superior to that of Example 7B including, as the carbon material A, Carbon Material d2 having a water vapor adsorption amount of 0.1 cm$^3$/g to less than 0.2 cm$^3$/g at 25° C. and a relative pressure of 0.1.

TABLE 12

| Example No./Comparative Example No. | Preparation Method of Catalyst Ink | Agglomerate X — Catalyst — Catalyst element — Kind | Pt Loading (mg/cm$^2$) | Percentage Content in Catalyst Layer (mass %) | Carbon Material A — Kind | Percentage Content in Catalyst Layer (mass %) | Carbon Material B — Kind | Percentage Content in Catalyst Layer (mass %) |
|---|---|---|---|---|---|---|---|---|
| Comparative Example 9B | 2 | Pt | 0.20 | 22 | a2 | 33 | j2 | 10 |
| Example 5B | 2 | Pt | 0.20 | 22 | b2 | 33 | j2 | 10 |
| Example 6B | 2 | Pt | 0.20 | 22 | c2 | 33 | j2 | 10 |
| Example 7B | 2 | Pt | 0.20 | 22 | d2 | 33 | j2 | 10 |
| Comparative Example 10B | 2 | Pt | 0.20 | 22 | e2 | 33 | j2 | 10 |
| Example 8B | 2 | Pt | 0.20 | 22 | f2 | 33 | j2 | 10 |
| Example 9B | 2 | Pt | 0.20 | 22 | g2 | 33 | j2 | 10 |
| Example 10B | 2 | Pt | 0.20 | 22 | h2 | 33 | j2 | 10 |
| Comparative Example 11B | 2 | Pt | 0.20 | 22 | i2 | 33 | j2 | 10 |
| Comparative Example 12B | 2 | Pt | 0.20 | 22 | j2 | 33 | j2 | 10 |
| Comparative Example 13B | 2 | Pt | 0.20 | 22 | k2 | 33 | j2 | 10 |
| Comparative Example 14B | 2 | Pt | 0.20 | 22 | l2 | 33 | j2 | 10 |

| Example No./Comparative Example No. | Agglomerate X Binder — Kind | Percentage Content in Catalyst Layer (mass %) | Agglomerate Y — Carbon Material B — Kind | Percentage Content in Catalyst Layer (mass %) | Binder — Kind | Percentage Content in Catalyst Layer (mass %) | Performance Evaluation Results (V) |
|---|---|---|---|---|---|---|---|
| Comparative Example 9B | — | 0 | j2 | 15 | PTFE | 20 | 1.103 |
| Example 5B | — | 0 | j2 | 15 | PTFE | 20 | 1.322 |
| Example 6B | — | 0 | j2 | 15 | PTFE | 20 | 1.341 |
| Example 7B | — | 0 | j2 | 15 | PTFE | 20 | 1.216 |
| Comparative Example 10B | — | 0 | j2 | 15 | PTFE | 20 | <0.8 |
| Example 8B | — | 0 | j2 | 15 | PTFE | 20 | 1.285 |
| Example 9B | — | 0 | j2 | 15 | PTFE | 20 | 1.332 |
| Example 10B | — | 0 | j2 | 15 | PTFE | 20 | 1.306 |
| Comparative Example 11B | — | 0 | j2 | 15 | PTFE | 20 | <0.8 |
| Comparative Example 12B | — | 0 | j2 | 15 | PTFE | 20 | <0.8 |
| Comparative Example 13B | — | 0 | j2 | 15 | PTFE | 20 | <0.8 |
| Comparative Example 14B | — | 0 | j2 | 15 | PTFE | 20 | <0.8 |

<Performance Evaluation Results 3>

Next, the performance was evaluated by changing the kind of the carbon material B contained in the agglomerate X and the percentage content in the catalyst layer. The compositions of the electrodes formed using the catalyst layer ink prepared by Preparation Method 2 of Catalyst Layer Ink and the performance evaluation results of air cells having incorporated thereinto each of the electrodes are shown in Table 13.

In the catalyst layers shown in Table 13, the loading of Pt as the catalyst element was consistently 0.20 mg/cm$^2$, the percentage content of the carbon material B in the catalyst layer was consistently 10 mass % as the portion contained in the agglomerate Y, and the binder that was not contained in the agglomerate X but contained only in the agglomerate Y consistently in an amount of 10 mass %. Carbon Material g2 satisfying the requirements of the present invention was used for the carbon material A, Carbon Material i2 satisfying the requirements of the present invention was used for the carbon material B contained in the agglomerate Y, and PTFE was used for the binder.

Examples 11B to 21B include, as the carbon material B contained in the agglomerate X, Carbon Materials e2, i2, j2, k2 and l2 each satisfying both conditions wherein the water vapor adsorption amount at 25° C. and a relative pressure of 0.1 is less than 0.1 cm$^3$/g and wherein the ratio X/S$_{BET}$ of the DBP absorption X (cm$^3$/100 g) to the specific surface area S$_{BET}$ by BET evaluation is 0.5 or more. The above-mentioned conditions are the requirements regarding the carbon material B of the present invention. In Examples 11B to 21B, a higher cell voltage was exerted and more excellent battery performance was exhibited, relative to Comparative Examples 15B to 22B including, as the carbon material B contained in the agglomerate X, Carbon Materials a2, b2, c2, d2, f2, g2 and h2 each failing in satisfying the requirements regarding the carbon material B of the present invention. Specifically, in Examples 20B and 21B including, as the carbon material B, Carbon Materials k2 and l2 having a water vapor adsorption amount of less than 0.05 cm$^3$/L, the battery properties were particularly good. In Table 13, Comparative Example 22B was compared with Examples 12B to 18B, where the percentage content of the carbon material B contained in the agglomerate X in the catalyst layer was changed in the range of 0 to 40 mass %. As a result, in Comparative Example 22B not containing the carbon material B in the agglomerate X or in Example 18B which contains 40 mass % of the carbon material B in the agglomerate X, contains 10 mass % of the carbon material B also in the agglomerate Y, and has a total percentage content of the carbon material B in the catalyst layer of 50 mass %, the performance was inferior to that in Examples 12B to 17B which contain the carbon material B in both the agglomerate X and the agglomerate Y and have a total percentage content in the catalyst layer of 5 mass % to less than 50 mass %. The properties were particularly good when the total percentage content in the catalyst layer was from 10 to 40 mass %. In Examples 13B to 17B where the percentage content of the carbon material B in the agglomerate X was from 0.1 to 0.5, the properties were particularly good.

TABLE 13

| | | Agglomerate X | | | | | |
| | | Catalyst | | | | | |
| | | Catalyst element | | | Carbon Material A | | Carbon Material B |
| Example No./ Comparative Example No. | Preparation Method of Catalyst Ink | Kind | Pt Loading (mg/cm$^2$) | Percentage Content in Catalyst Layer (mass %) | Kind | Percentage Content in Catalyst Layer (mass %) | Kind | Percentage Content in Catalyst Layer (mass %) |
|---|---|---|---|---|---|---|---|---|
| Comparative Example 15B | 2 | Pt | 0.20 | 26 | g2 | 39 | a2 | 15 |
| Comparative Example 16B | 2 | Pt | 0.20 | 26 | g2 | 39 | b2 | 15 |
| Comparative Example 17B | 2 | Pt | 0.20 | 26 | g2 | 39 | c2 | 15 |
| Comparative Example 18B | 2 | Pt | 0.20 | 26 | g2 | 39 | d2 | 15 |
| Example 11B | 2 | Pt | 0.20 | 26 | g2 | 39 | e2 | 15 |
| Comparative Example 19B | 2 | Pt | 0.20 | 26 | g2 | 39 | f2 | 15 |
| Comparative Example 20B | 2 | Pt | 0.20 | 26 | g2 | 39 | g2 | 15 |
| Comparative Example 21B | 2 | Pt | 0.20 | 26 | g2 | 39 | h2 | 15 |
| Comparative Example 22B | 2 | Pt | 0.20 | 32 | g2 | 48 | i2 | 0 |
| Example 12B | 2 | Pt | 0.20 | 30.8 | g2 | 46.2 | i2 | 3 |
| Example 13B | 2 | Pt | 0.20 | 30 | g2 | 45 | i2 | 5 |
| Example 14B | 2 | Pt | 0.20 | 28 | g2 | 42 | i2 | 10 |
| Example 15B | 2 | Pt | 0.20 | 26 | g2 | 39 | i2 | 15 |
| Example 16B | 2 | Pt | 0.20 | 24 | g2 | 36 | i2 | 20 |
| Example 17B | 2 | Pt | 0.20 | 20 | g2 | 30 | i2 | 30 |
| Example 18B | 2 | Pt | 0.20 | 16 | g2 | 24 | i2 | 40 |
| Example 19B | 2 | Pt | 0.20 | 26 | g2 | 39 | j2 | 15 |
| Example 20B | 2 | Pt | 0.20 | 26 | g2 | 39 | k2 | 15 |
| Example 21B | 2 | Pt | 0.20 | 26 | g2 | 39 | l2 | 15 |

TABLE 13-continued

| | | Agglomerate X Binder | | Agglomerate Y | | | |
| | | | | Carbon Material B | | Binder | |
| Example No./ Comparative Example No. | Kind | Percentage Content in Catalyst Layer (mass %) | Kind | Percentage Content in Catalyst Layer (mass %) | Kind | Percentage Content in Catalyst Layer (mass %) | Performance Evaluation Results (V) |
|---|---|---|---|---|---|---|---|
| Comparative Example 15B | — | 0 | i2 | 10 | PTFE | 10 | 0.961 |
| Comparative Example 16B | — | 0 | i2 | 10 | PTFE | 10 | 0.983 |
| Comparative Example 17B | — | 0 | i2 | 10 | PTFE | 10 | 1.002 |
| Comparative Example 18B | — | 0 | i2 | 10 | PTFE | 10 | 1.024 |
| Example 11B | — | 0 | i2 | 10 | PTFE | 10 | 1.259 |
| Comparative Example 19B | — | 0 | i2 | 10 | PTFE | 10 | 0.916 |
| Comparative Example 20B | — | 0 | i2 | 10 | PTFE | 10 | 1.050 |
| Comparative Example 21B | — | 0 | i2 | 10 | PTFE | 10 | 1.081 |
| Comparative Example 22B | — | 0 | i2 | 10 | PTFE | 10 | 0.901 |
| Example 12B | — | 0 | i2 | 10 | PTFE | 10 | 1.151 |
| Example 13B | — | 0 | i2 | 10 | PTFE | 10 | 1.183 |
| Example 14B | — | 0 | i2 | 10 | PTFE | 10 | 1.201 |
| Example 15B | — | 0 | i2 | 10 | PTFE | 10 | 1.297 |
| Example 16B | — | 0 | i2 | 10 | PTFE | 10 | 1.301 |
| Example 17B | — | 0 | i2 | 10 | PTFE | 10 | 1.186 |
| Example 18B | — | 0 | i2 | 10 | PTFE | 10 | 1.121 |
| Example 19B | — | 0 | i2 | 10 | PTFE | 10 | 1.329 |
| Example 20B | — | 0 | i2 | 10 | PTFE | 10 | 1.334 |
| Example 21B | — | 0 | i2 | 10 | PTFE | 10 | 1.340 |

<Performance Evaluation Results 4>

Next, the performance was evaluated by changing the kind of the carbon material B contained in the agglomerate Y and the percentage content in the catalyst layer. The compositions of the electrodes formed using the catalyst layer ink prepared in Preparation Method 2 of Catalyst Layer Ink and the performance evaluation results of air cells having incorporated thereinto each electrode are shown in Table 14.

In the catalyst layers shown in Table 14, the loading of Pt as the catalyst element was consistently 0.20 mg/cm$^2$, the percentage content of the carbon material B in the catalyst layer was 5 mass % as the portion contained in the agglomerate X, and the percentage content of the binder in the catalyst layer, the binder being not contained in the agglomerate X but contained only in the agglomerate Y, was consistently 10 mass %. Specifically, in Examples 25B to 27B, the percentage content of the carbon material B in the agglomerate Y in the catalyst layer was fixed to 3 mass %, and the percentage content of the carbon material B in the agglomerate X in the catalyst layer was changed. Carbon Material c2 satisfying the requirements of the present invention was used for the carbon material A, Carbon Material k2 satisfying the requirements of the present invention was used for the carbon material B contained in the agglomerate X, and PTFE was used for the binder.

Examples 22B to 34B include, as the carbon material B contained in the agglomerate Y, Carbon Materials e2, i2, j2, k2 and l2 each satisfying both conditions wherein the water vapor adsorption amount at 25° C. and a relative pressure of 0.1 is less than 0.1 cm$^3$/g and wherein the ratio X/S$_{BET}$ of the DBP absorption X (cm$^3$/100 g) to the specific surface area S$_{BET}$ by BET evaluation is 0.5 or more. The above-mentioned conditions are the requirements regarding the carbon material B of the present invention. In Examples 22B to 34B, a higher cell voltage was exerted and more excellent battery performance was exhibited, relative to Comparative Examples 23B to 29B which include, as the carbon material B contained in the agglomerate Y, Carbon Materials a2, b2, c2, d2, f2, g2 and h2 each failing in satisfying the requirements regarding the carbon material B of the present invention. In Table 14, when Comparative Example 30B was compared with Examples 25B to 33B, where the percentage content of the carbon material B contained in the agglomerate Y in the catalyst layer was changed in the range of 0 to 45 mass %, in Comparative Example 30B not containing the carbon material B in the agglomerate Y, in Example 25B containing 1 mass % of the carbon material B in the agglomerate X, containing 3 mass % of the carbon material B in the agglomerate Y, and having a total percentage content of the carbon material B in the catalyst layer of less than 5 mass %, or in Example 33B which contains 5 mass % of the carbon material B in the agglomerate X, contains 45 mass % of the carbon material B also in the agglomerate Y, and has a total percentage content of the carbon material B in the catalyst layer of 50 mass % or more, the performance was inferior to that in Examples 26B to 32B containing the carbon material B in both the agglomerate X and the agglomerate Y and having a total percentage content in the catalyst layer of 5 mass % to less than 50 mass %.

Among the catalyst layers shown in Table 14, with respect to the catalyst layers of Examples 28B and 30B, the cross-sectional configuration was observed in the same manner as in <Performance Evaluation Results 1>. When the number of black portions where a carbon material was present in the secondary electron image of the same field was counted among black portions of 300 nm or more, it was confirmed that the number of the of black portions was 1 or more. Furthermore, when black portions having an equivalent-circle diameter of less than 500 nm were eliminated, in Example 28B, the remaining black portions included no black portion where a carbon material was present in the secondary electron image of the same field. However, in Example 30B which was excellent particularly in the power generation performance, when counting the number of black portions where a carbon material was present in the secondary electron image of the same field in the remaining black portions, it was found that the number of the black portions was 1 or more. Accordingly, it could be confirmed that the catalyst layer of Example 30B has the particularly preferable configuration of the present invention. Here, the reason why Example 30B has the above-described configuration includes the fact that the percentage content of the carbon material B in the agglomerate Y is higher in Example 30B than in Example 28B.

TABLE 14

| Example No./ Comparative Example No. | Preparation Method of Catalyst Ink | Agglomerate X Catalyst element Kind | Pt Loading (mg/cm$^2$) | Percentage Content in Catalyst Layer (mass %) | Carbon Material A Kind | Percentage Content in Catalyst Layer (mass %) | Carbon Material B Kind | Percentage Content in Catalyst Layer (mass %) |
|---|---|---|---|---|---|---|---|---|
| Comparative Example 23B | 2 | Pt | 0.20 | 24 | c2 | 36 | k2 | 5 |
| Comparative Example 24B | 2 | Pt | 0.20 | 24 | c2 | 36 | k2 | 5 |
| Comparative Example 25B | 2 | Pt | 0.20 | 24 | c2 | 36 | k2 | 5 |
| Comparative Example 26B | 2 | Pt | 0.20 | 24 | c2 | 36 | k2 | 5 |
| Example 22B | 2 | Pt | 0.20 | 24 | c2 | 36 | k2 | 5 |
| Comparative Example 27B | 2 | Pt | 0.20 | 24 | c2 | 36 | k2 | 5 |
| Comparative Example 28B | 2 | Pt | 0.20 | 24 | c2 | 36 | k2 | 5 |
| Comparative Example 29B | 2 | Pt | 0.20 | 24 | c2 | 36 | k2 | 5 |
| Example 23B | 2 | Pt | 0.20 | 24 | c2 | 36 | k2 | 5 |
| Example 24B | 2 | Pt | 0.20 | 24 | c2 | 36 | k2 | 5 |
| Comparative Example 30B | 2 | Pt | 0.20 | 34 | c2 | 51 | k2 | 5 |
| Example 25B | 2 | Pt | 0.20 | 34.4 | c2 | 51.6 | k2 | 1 |
| Example 26B | 2 | Pt | 0.20 | 33.6 | c2 | 50.4 | k2 | 3 |
| Example 27B | 2 | Pt | 0.20 | 32.8 | c2 | 49.2 | k2 | 5 |
| Example 28B | 2 | Pt | 0.20 | 32 | c2 | 48 | k2 | 5 |
| Example 29B | 2 | Pt | 0.20 | 30 | c2 | 45 | k2 | 5 |
| Example 30B | 2 | Pt | 0.20 | 28 | c2 | 42 | k2 | 5 |
| Example 31B | 2 | Pt | 0.20 | 24 | c2 | 36 | k2 | 5 |
| Example 32B | 2 | Pt | 0.20 | 20 | c2 | 30 | k2 | 5 |
| Example 33B | 2 | Pt | 0.20 | 16 | c2 | 24 | k2 | 5 |
| Example 34B | 2 | Pt | 0.20 | 24 | c2 | 36 | k2 | 5 |

| Example No./ Comparative Example No. | Agglomerate X Binder Kind | Percentage Content in Catalyst Layer (mass %) | Agglomerate Y Carbon Material B Kind | Percentage Content in Catalyst Layer (mass %) | Binder Kind | Percentage Content in Catalyst Layer (mass %) | Performance Evaluation Results (V) |
|---|---|---|---|---|---|---|---|
| Comparative Example 23B | — | 0 | a2 | 25 | PTFE | 10 | <0.8 |
| Comparative Example 24B | — | 0 | b2 | 25 | PTFE | 10 | <0.8 |
| Comparative Example 25B | — | 0 | c2 | 25 | PTFE | 10 | 1.025 |
| Comparative Example 26B | — | 0 | d2 | 25 | PTFE | 10 | 1.112 |
| Example 22B | — | 0 | e2 | 25 | PTFE | 10 | 1.307 |
| Comparative Example 27B | — | 0 | f2 | 25 | PTFE | 10 | <0.8 |
| Comparative Example 28B | — | 0 | g2 | 25 | PTFE | 10 | 1.017 |
| Comparative Example 29B | — | 0 | h2 | 25 | PTFE | 10 | 1.025 |

TABLE 14-continued

| | | | | | | | |
|---|---|---|---|---|---|---|---|
| Example 23B | — | 0 | i2 | 25 | PTFE | 10 | 1.219 |
| Example 24B | — | 0 | j2 | 25 | PTFE | 10 | 1.313 |
| Comparative Example 30B | — | 0 | k2 | 0 | PTFE | 10 | <0.8 |
| Example 25B | — | 0 | k2 | 3 | PTFE | 10 | 1.123 |
| Example 26B | — | 0 | k2 | 3 | PTFE | 10 | 1.131 |
| Example 27B | — | 0 | k2 | 3 | PTFE | 10 | 1.142 |
| Example 28B | — | 0 | k2 | 5 | PTFE | 10 | 1.188 |
| Example 29B | — | 0 | k2 | 10 | PTFE | 10 | 1.282 |
| Example 30B | — | 0 | k2 | 15 | PTFE | 10 | 1.321 |
| Example 31B | — | 0 | k2 | 25 | PTFE | 10 | 1.319 |
| Example 32B | — | 0 | k2 | 35 | PTFE | 10 | 1.216 |
| Example 33B | — | 0 | k2 | 45 | PTFE | 10 | 1.133 |
| Example 34B | — | 0 | l2 | 25 | PTFE | 10 | 1.317 |

<Performance Evaluation Results 5>

The catalyst layers of Examples 35B and 36B shown in Table 15-1 were formed to have a catalyst layer configuration in which the percentage content α of the carbon material B on the negative electrode (zinc electrode)-facing side is from 0 mass % to less than 20 mass %, the percentage content β of the carbon material B on the porous diffusion layer side is from more than 10 mass % to less than 50 mass %, and α<β is satisfied. The catalyst layer of Example 35B had a two-layer configuration, and the catalyst layer of Example 36B had a five-layer configuration. Here, in the agglomerate X of Examples 35B and 36B, Carbon Material c2 satisfying the requirements of the present invention was used as the carbon material A, and Carbon Material k2 satisfying the requirements of the present invention was used as the carbon material B. In the agglomerate Y of Examples 35B and 36B, Carbon Material k2 was used as the carbon material B.

The preparation method of the catalyst layer of Example 35B is described below. The hydrophobic porous layer was cut into a 10-cm square (100 cm²). First, a catalyst layer ink having a Pt concentration of 0.25 mass % was prepared to provide the composition shown in the lower row of Example 35B of Table 15-1, this catalyst layer ink was applied by spraying and vacuum-dried at 90° C., and the coating amount was adjusted such that the Pt loading calculated from the change in mass of the hydrophobic porous layer between before and after coating becomes 0.10 mg/cm². Subsequently, a catalyst layer ink having a Pt concentration of 0.25 mass % was prepared to provide the composition shown in the upper row of Example 35B of Table 15-1, this catalyst layer ink was applied by spraying and vacuum-dried at 90° C., and the coating amount was adjusted such that the Pt loading calculated from the change in mass of the hydrophobic porous layer between before and after coating becomes 0.10 mg/cm². As a result, the catalyst layer of Example 35B having a platinum loading of 0.20 mg/cm², in which two layers of a catalyst layer having a percentage content of the carbon material B of 30 mass % and a catalyst layer having a percentage content of the carbon material B of 10 mass % were stacked, was obtained on MPL of the hydrophobic porous layer.

In producing the catalyst layer of Example 36B shown in Table 15-1, in addition to the Pt catalyst of 40 mass % prepared above, Pt catalysts having a supported rate of 25 mass %, 30 mass %, 40 mass % and 50 mass % were newly prepared using Carbon Material c2 as the carbon material A of the catalyst support according to the method described in <Preparation of Catalyst>. Using these four kinds of Pt catalysts with a supported rate of 25 mass %, 30 mass %, 40 mass % and 50 mass %, five kinds of catalyst layer inks were prepared to provide five kinds of compositions (the catalyst of 30 mass % was used in two kinds of compositions) shown in Example 36B of Table 15-1. Using five kinds of catalyst layer inks, spray coating, vacuum drying at 90° C., and measurement of the change in weight between before and after coating were repeated in order from the catalyst layer ink having the composition of the lowest row shown in Example 36B of Table 15-1, and each catalyst layer ink was applied wet-on-wet while adjusting the coating amount such that the Pt loading becomes 0.04 mg/cm². As a result, the catalyst layer of Example 36B having a platinum loading of 0.20 mg/cm², in which the percentage content of the carbon material B was stepwise changed from 40 mass % to 0 mass % starting from the hydrophobic porous layer side, was obtained on MPL of the hydrophobic porous layer.

As for the performance test results of these catalyst layers of Examples 35B and 36B, results surpassing all of Comparative Examples and Examples shown in Tables 10 to 14 were obtained. The results are shown in Table 15-2.

TABLE 15-1

| | | | Agglomerate X | | | | | |
|---|---|---|---|---|---|---|---|---|
| | | | Catalyst | | | | | |
| | | | Catalyst element | | | | Carbon Material A | |
| | | | | Pt Loading | | Percentage Content in | | Percentage Content in |
| Example No./ Comparative Example No. | Preparation Method of Catalyst Ink | Kind | Supported Rate of Catalyst (mass %) | Each Layer (mg/cm²) | Total (mg/cm²) | Catalyst Layer (mass %) | Kind | Catalyst Layer (mass %) |
| Example 35B | 2 | Pt | 40.0 | 0.10 | 0.20 | 32 | c2 | 48 |
| | 2 | Pt | 40.0 | 0.10 | | 24 | c2 | 36 |

TABLE 15-1-continued

| Example No. | | | | | | | | |
|---|---|---|---|---|---|---|---|---|
| Example 36B | 2 | Pt | 25.0 | 0.04 | 0.20 | 25 | c2 | 75 |
| | 2 | Pt | 30.0 | 0.04 | | 25 | c2 | 58 |
| | 2 | Pt | 30.0 | 0.04 | | 25 | c2 | 58 |
| | 2 | Pt | 40.0 | 0.04 | | 25 | c2 | 38 |
| | 2 | Pt | 50.0 | 0.04 | | 25 | c2 | 25 |

| | Agglomerate X | | | | Agglomerate Y | | | |
|---|---|---|---|---|---|---|---|---|
| | Carbon Material B | | Binder | | Carbon Material B | | Binder | |
| Example No./ Comparative Example No. | Kind | Percentage Content in Catalyst Layer (mass %) | Kind | Percentage Content in Catalyst Layer (mass %) | Kind | Percentage Content in Catalyst Layer (mass %) | Kind | Percentage Content in Catalyst Layer (mass %) |
| Example 35B | k2 | 5 | — | 0 | k2 | 5 | PTFE | 10 |
| | k2 | 10 | — | 0 | k2 | 20 | PTFE | 10 |
| Example 36B | k2 | 0 | — | 0 | — | 0.0 | — | 0 |
| | k2 | 5 | — | 0 | k2 | 9.7 | PTFE | 2 |
| | k2 | 5 | — | 0 | k2 | 7.7 | PTFE | 4 |
| | k2 | 8 | — | 0 | k2 | 23.5 | PTFE | 6 |
| | k2 | 10 | — | 0 | k2 | 30.0 | PTFE | 10 |

TABLE 15-2

| Example No./ Comparative Example No. | Performance Evaluation Results (V) |
|---|---|
| Example 35B | 1.331 |
| Example 36B | 1.329 |

Preferred embodiments have been described so far with reference to the accompanying drawings, but the present invention is not limited to the above-described examples. It will be evident that one skilled in the art to which the present invention pertains may conceive a variety of changes and modifications within the technical idea described in the claims, and it should be understood that such changes and modifications are of course included in the technical scope of the present invention.

DESCRIPTION OF NUMERICAL REFERENCES

1 Negative electrode
2 Separator or electrolyte membrane
3 Positive electrode
4 Catalyst layer
5 Porous layer
6 Aqueous electrolyte solution
7 Current collector (negative electrode)
8 Current collector (positive electrode)
9 Interface between aqueous electrolyte solution and air (a portion in which a triple phase boundary can be expected)
10 PTFE or wax
11 Hydrophobic carbon material (in the present invention, carbon material B)
12 Carbon material having supported thereon a catalyst element
13 Electrolyte material
14 Carbon material of conductive assistant
15 Gas diffusion carbon material
16 Catalyst containing agglomerate
17 Gas diffusion agglomerate
18 Carbon material A having supported thereon a catalyst element
19 Carbon material B
20 Agglomerate X
21 Agglomerate Y
22 Carbon material A
23 Catalyst element

The invention claimed is:

1. An electrode for a metal-air battery, wherein:
a catalyst layer of an air electrode of a metal-air battery contains a catalyst element and a carbon material,
the carbon material comprises two materials of a hydrophilic carbon material A having supported thereon the catalyst element and a hydrophobic carbon material B not supporting the catalyst element,
the catalyst layer comprises a hydrophilic agglomerate X containing more than 50 mass % in total of the catalyst element, the carbon material A and the carbon material B, and a hydrophobic agglomerate Y containing more than 50 mass % of the carbon material B,
the agglomerate X is a continuum and the agglomerate Y is dispersed in the agglomerate x,
the carbon material A satisfies the following characteristic feature (i) or (ii), and
in the carbon material B, a water vapor adsorption amount is less than 0.1 cm$^3$/g in an environment of 25° C. and a relative pressure of 0.1 and a ratio (X/S$_{BET}$) of the DBP absorption (X) (cm$^3$/100 g) to a specific surface area (S$_{BET}$) by BET evaluation is 0.5 or more, and wherein
an interface between an aqueous electrolyte solution and an air is formed in the catalyst layer;
(i) in the carbon material A, the water vapor adsorption amount is 0.1 cm$^3$/g or more in an environment of 25° C. and a relative pressure of 0.1, a ratio S$_{micro}$/S$_{total}$ of a micropore surface area S$_{micro}$ as determined by t-plot analysis of a nitrogen adsorption isotherm to a total surface area S$_{total}$ is 0.90 or more, an average particle diameter d50 is less than 1.5 μm, and a ratio (d90−d10)/d50 of the difference between d90 and d10 (d90−d10) to d50 is less than 1.0; or
(ii) in the carbon material A, the water vapor adsorption amount is 0.1 cm$^3$/g or more in an environment of 25° C. and a relative pressure of 0.1 and the ratio S$_{micro}$/S$_{total}$ of the micropore surface area S$_{micro}$ as determined by t-plot analysis of a nitrogen adsorption isotherm to the total surface area S$_{total}$ is 0.90 or less.

2. The electrode for a metal-air battery according to claim 1, wherein:
  in the carbon material A, the water vapor adsorption amount is 0.1 cm³/g or more in an environment of 25° C. and a relative pressure of 0.1, the ratio $S_{micro}/S_{total}$ of the micropore surface area $S_{micro}$ as determined by t-plot analysis of a nitrogen adsorption isotherm to the total surface area $S_{total}$ is 0.90 or more, the average particle diameter d50 is less than 1.5 μm, and the ratio (d90−d10)/d50 of the difference between d90 and d10 (d90−d10) to d50 is less than 1.0, and
  the content of the carbon material B in the catalyst layer is from more than 10 mass % to less than 50 mass %.

3. The electrode for a metal-air battery according to claim 1, wherein:
  in the carbon material A, the water vapor adsorption amount is 0.1 cm³/g or more in an environment of 25° C. and a relative pressure of 0.1 and the ratio $S_{micro}/S_{total}$ of the micropore surface area $S_{micro}$ as determined by t-plot analysis of a nitrogen adsorption isotherm to the total surface area $S_{total}$ is 0.90 or less, and
  the content of the carbon material B in the catalyst layer is from 5 mass % to less than 50 mass %.

4. The electrode for a metal-air battery according to claim 1, wherein one or more carbon material agglomerates each having a size of 300 nm or more in terms of an equivalent-circle diameter and not supporting a catalyst element are present in a visual field of 10 μm×10 μm in a cross-section of the catalyst layer.

5. The electrode for a metal-air battery according to claim 2, wherein one or more carbon material agglomerates each having a size of 300 nm or more in terms of an equivalent-circle diameter and not supporting a catalyst element are present in a visual field of 10 μm×10 μm in a cross-section of the catalyst layer.

6. The electrode for a metal-air battery according to claim 3, wherein one or more carbon material agglomerates each having a size of 300 nm or more in terms of an equivalent-circle diameter and not supporting a catalyst element are present in a visual field of 10 μm×10 μm in a cross-section of the catalyst layer.

7. The electrode for a metal-air battery according to claim 1, wherein:
  the percentage content a of the carbon material B on a metal electrode-facing side in the catalyst layer is from 0 mass % to less than 20 mass %,
  a percentage content β of the carbon material B on an open-to-air side in the catalyst layer is from more than 10 mass % to less than 50 mass %, and α<β is satisfied.

8. The electrode for a metal-air battery according to claim 2, wherein:
  the percentage content a of the carbon material B on a metal electrode-facing side in the catalyst layer is from 0 mass % to less than 20 mass %,
  a percentage content β of the carbon material B on an open-to-air side in the catalyst layer is from more than 10 mass % to less than 50 mass %, and
  α<β is satisfied.

9. The electrode for a metal-air battery according to claim 3 wherein:
  the percentage content a of the carbon material B on a metal electrode-facing side in the catalyst layer is from 0 mass % to less than 20 mass %,
  a percentage content β of the carbon material B on an open-to-air side in the catalyst layer is from more than 10 mass % to less than 50 mass %, and
  α<β is satisfied.

10. The electrode for a metal-air battery according to claim 4, wherein:
  the percentage content a of the carbon material B on a metal electrode-facing side in the catalyst layer is from 0 mass % to less than 20 mass %,
  a percentage content β of the carbon material B on an open-to-air side in the catalyst layer is from more than 10 mass % to less than 50 mass %, and
  α<β is satisfied.

11. The electrode for a metal-air battery according to claim 5, wherein:
  the percentage content a of the carbon material B on a metal electrode-facing side in the catalyst layer is from 0 mass % to less than 20 mass %,
  a percentage content β of the carbon material B on an open-to-air side in the catalyst layer is from more than 10 mass % to less than 50 mass %, and
  α<β is satisfied.

12. The electrode for a metal-air battery according to claim 6, wherein:
  the percentage content a of the carbon material B on a metal electrode-facing side in the catalyst layer is from 0 mass % to less than 20 mass %,
  a percentage content β of the carbon material B on an open-to-air side in the catalyst layer is from more than 10 mass % to less than 50 mass %, and
  α<β is satisfied.

* * * * *